US011038569B2

(12) United States Patent
Lee et al.

(10) Patent No.: US 11,038,569 B2
(45) Date of Patent: Jun. 15, 2021

(54) ELECTRONIC DEVICE FOR SWEEPING ANTENNA PHASE

(71) Applicant: SAMSUNG ELECTRONICS CO., LTD., Suwon-si (KR)

(72) Inventors: Dongju Lee, Suwon-si (KR); Bongsup Son, Suwon-si (KR); Wonjin Choi, Suwon-si (KR); Seokkun Hyung, Suwon-si (KR)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 16/771,422

(22) PCT Filed: Jan. 11, 2019

(86) PCT No.: PCT/KR2019/000465
§ 371 (c)(1),
(2) Date: Jun. 10, 2020

(87) PCT Pub. No.: WO2019/143072
PCT Pub. Date: Jul. 25, 2019

(65) Prior Publication Data
US 2020/0389213 A1 Dec. 10, 2020

(30) Foreign Application Priority Data

Jan. 18, 2018 (KR) .......................... 10-2018-0006408

(51) Int. Cl.
*H04B 7/06* (2006.01)
*H04B 7/0404* (2017.01)

(52) U.S. Cl.
CPC ............. *H04B 7/06* (2013.01); *H04B 7/0404* (2013.01)

(58) Field of Classification Search
CPC .......... H04B 7/02; H04B 7/06; H04B 7/0602; H04B 7/0604; H04B 7/0608; H04B 7/0404
See application file for complete search history.

(56) References Cited

U.S. PATENT DOCUMENTS 8,064,862 B2   11/2011   Rudberg
9,161,366 B2   10/2015   Liu et al.
9,166,279 B2   10/2015   Jin et al.
(Continued)

FOREIGN PATENT DOCUMENTS

KR   10-1284442      7/2013
KR   10-1600268      3/2016
KR   10-2017-0140691 12/2017

OTHER PUBLICATIONS

International Search Report for PCT/KR2019/000465 dated Apr. 19, 2019, 4 pages.
(Continued)

*Primary Examiner* — Siu M Lee
(74) *Attorney, Agent, or Firm* — Nixon & Vanderhye, P.C.

(57) ABSTRACT

An electronic device according to an embodiment disclosed in the disclosure includes a housing, a plurality of antennas positioned at mutually different areas of the housing, respectively, a wireless communication circuitry to transmit a diversity signal using the plurality of antennas, a processor operatively connected with the wireless communication circuitry, and a memory operatively connected with the processor to store instructions.

15 Claims, 14 Drawing Sheets

(56) References Cited

U.S. PATENT DOCUMENTS

| | | | | |
|---|---|---|---|---|
| 9,504,018 B2* | 11/2016 | Gormley | ............ | H04L 25/03343 |
| 2011/0237208 A1* | 9/2011 | Sendonaris | .......... | H04B 7/0682 |
| | | | | 455/101 |
| 2012/0115428 A1 | 5/2012 | Rudberg | | |
| 2017/0358847 A1* | 12/2017 | Cho | ..................... | H05K 7/1427 |
| 2019/0319693 A1* | 10/2019 | Ciochina | ............. | H04B 7/0452 |

OTHER PUBLICATIONS

Written Opinion of the ISA for PCT/KR2019/000465 dated Apr. 19, 2019, 4 pages.

* cited by examiner

2nd TX Antenna Constellation Diagram

ELECTRONIC DEVICE FOR SWEEPING ANTENNA PHASE

This application is the U.S. national phase of International Application No. PCT/KR2019/000465 filed Jan. 11, 2019 which designated the U.S. and claims priority to KR Patent Application No. 10-2018-0006408 filed Jan. 18, 2018, the entire contents of each of which are hereby incorporated by reference.

TECHNICAL FIELD

Embodiments disclosed in the disclosure relate to a technology for sweeping a phase of an antenna.

BACKGROUND ART

With the development of a mobile communication technology, a frequency band that is able to be used by an electronic device (e.g., a smartphone) is gradually increased. For example, a fourth generation mobile communication technology (e.g., LTE) may use several frequency bands for each country and/or communication company, which is different form a third mobile communication technology using some frequency bands.

The above-described electronic device may include an antenna system for using several frequency bands. For example, a multiple-input multiple-output (MIMO) system utilizing a plurality of antennas may use multiple transmit antennas and multiple receive antennas, beyond one transmit antenna and one receive antenna.

The electronic device may control phases of multiple transmit antennas to improve a signal transmit rate. For example, the electronic device may transmit a transmit signal to a base station and may determine a phase for a next transmit signal based on a target power control (TPC) command received from the base station. However, according to the above-described phase control method, many slots may be required to determine the optimal phase corresponding to a base station direction. As time to determine the optimal phase corresponding to the base station direction is delayed, the transmission efficiency of the multiple transmit antennas may be reduced, and the power consumption of the electronic device may be increased.

SUMMARY

Embodiments disclosed in the disclosure are to provide an electronic device to solve the above-mentioned problems and issues raises herein.

In accordance with an aspect of the disclosure, an electronic device may include a housing, a plurality of antennas positioned at mutually different areas of the housing, respectively, a wireless communication circuitry to transmit a diversity signal using the plurality of antennas, a processor operatively connected with the wireless communication circuitry, and a memory operatively connected with the processor to store instructions. The instructions may cause the processor to, when executed, receive at least one signal from a base station using the antennas, measure the at least one signal which is received, select a first antenna of the antennas, based at least partially on the measured result, transmit at least one signal to transmit the diversity signal using the antennas, determine at least one gain of at least one transmitted signal, select a second antenna of the antennas based at least partially on the determined gain, compare the first antenna with the second antenna, and sweep a phase of at least one of the antennas based on at least partially on the comparison result.

In accordance with another aspect of the disclosure, an electronic device may include a housing including a cover glass, a back cover opposite to the cover glass, and a side-surface member surrounding a space between the cover glass and the back cover, a plurality of antennas including mutually different areas of the side-surface member, a communication circuitry electrically connected with each of the plurality of antennas, and a processor electrically connected with the communication circuitry. The processor may be configured to receive a first signal from a base station through the communication circuitry and the plurality of antennas, determine, as a first best antenna, one of the plurality of antennas, based on a first parameter associated with power of the first signal, transmit a second signal to the base station through the communication circuitry and the plurality of antennas, receive a third signal fed back through the communication circuitry in a process in which the second signal is transmitted, measure a second parameter associated with a gain of the plurality of antennas, based on the third signal, determine, as a second best antenna, one of the plurality of antennas, based on the second parameter, and sweep a phase of at least one of the plurality of antennas based on whether the first best antenna is matched to the second best antenna.

In accordance with another aspect of the disclosure, a method may include receiving a first signal from a base station through a communication circuitry and the plurality of antennas, determining, as a first best antenna, one of the plurality of antennas, based on a first parameter associated with power of the first signal, transmitting a second signal to the base station through the communication circuitry and the plurality of antennas, receiving a third signal fed back through the communication circuitry in a process in which the second signal is transmitted, measuring a second parameter associated with a gain of the plurality of antennas, based on the third signal, determining, as a second best antenna, one of the plurality of antennas, based on the second parameter, and sweeping a phase of at least one of the plurality of antennas based on whether the first best antenna is matched to the second best antenna.

According to embodiments disclosed in the disclosure, the time to determine the optimal phase may be reduced in the multi-transmit antenna system. In addition, according to embodiments disclosed in the disclosure, the efficiency of the multi-transmit antenna system may be increased, and the power consumption may be reduced.

Besides, a variety of effects directly or indirectly understood through the disclosure may be provided.

DETAILED DESCRIPTION OF EXAMPLE EMBODIMENTS

Figure 1:
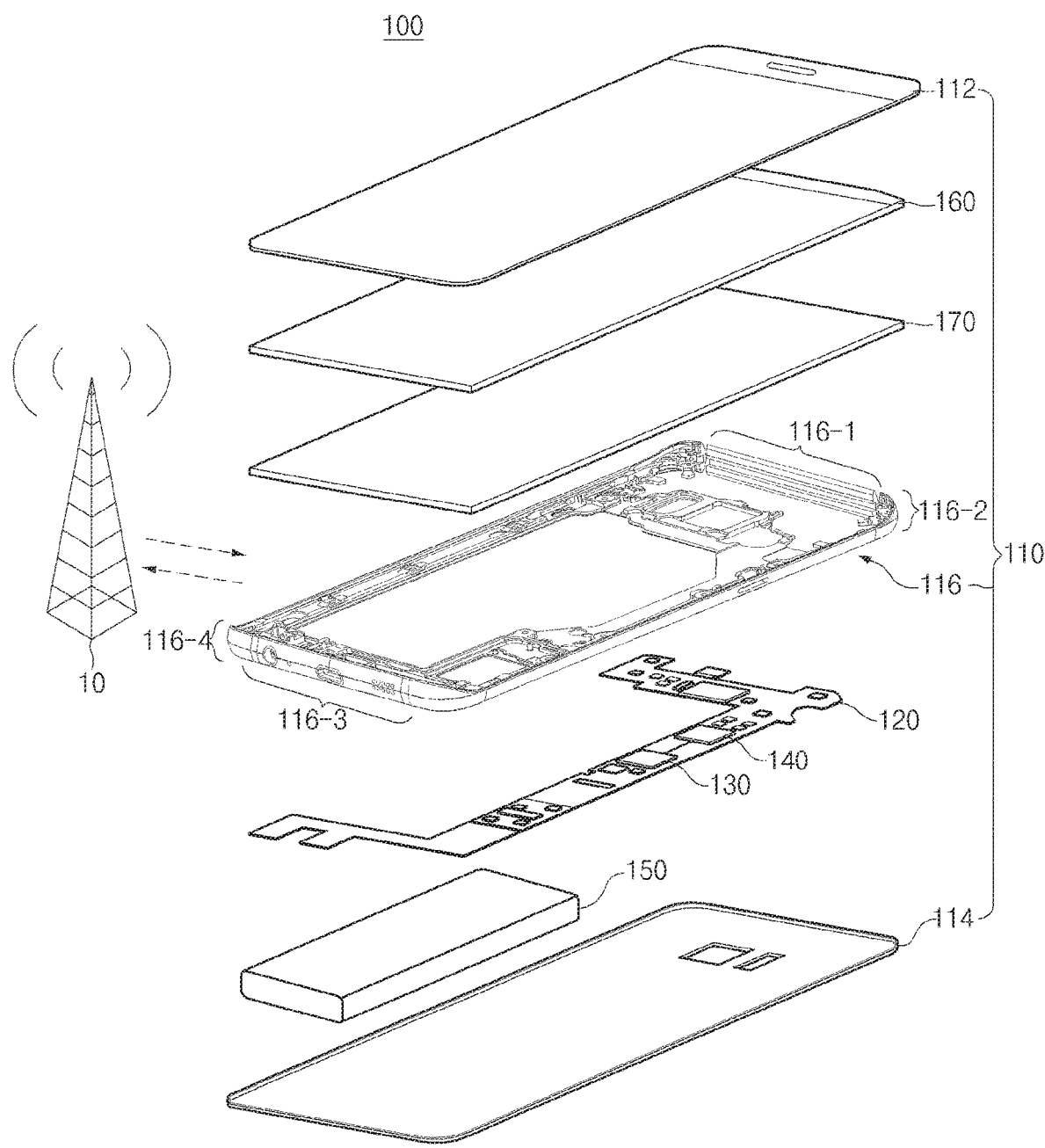
FIG. 1 illustrates an exploded perspective view of an electronic device, according to an embodiment.

FIG. 1 illustrates an exploded perspective view of an electronic device, according to an embodiment.

Referring to FIG. 1, an electronic device 100 may include a housing 110, a printed circuitry board 120, a battery 150, a display 160, and a shielding layer 170.

The housing 110 may form an outer appearance of the electronic device 100. For example, the housing 110 may include a cover glass 112, a back cover 114 opposite to the cover glass 112, and a side-surface member 116 to surround a space between the cover glass 112 and the back cover 114.

The cover glass 112 may transmit light generated from the display 160. In addition, as a user touches the cover glass 112 with a part of the physical body of the user, a touch operation (including the contact with an electronic pen) is performed on the cover glass 112. The cover glass 112 may be formed of, for example, a tampered glass, reinforced plastic, or a flexible polymeric material. According to an embodiment, the cover glass 112 may be referred to as a "glass window".

The back cover 114 may be coupled to a rear surface (that is, a bottom of the side-surface member 116) of the electronic device 100. The back cover 114 may be formed of tempered glass, plastic, and/or metal. According to an embodiment, the back cover 114 may be implemented integrally with the side-surface member 116 or may be implemented detachably from a user.

The side-surface member 116 may protect components included in the electronic device 100. For example, the display 160, the printed circuitry board 120, and the battery 150 may be received inside the side-surface member 116, and the side-surface member 116 may protect the components from an external impact.

According to an embodiment, at least a portion of the side-surface member 116 may be formed of metal. The at least a portion of the side-surface member 116 may be utilized as an antenna to transmit/receive a signal in a specified frequency band. For example, the electronic device 100 may transmit/receive the signal in the specified frequency band by feeding power to a first antenna 116-1, a second antenna 116-2, a third antenna 116-3, and/or a fourth antenna 116-4.

The printed circuitry board 120 may mount various electronic components, devices, and printed circuitries of the electronic device 100. For example, the printed circuitry board 120 may mount a communication circuitry 130, a processor 140 (or a communication processor (CP)), a memory, or an application processor (AP). In the disclosure, the printed circuitry board 120 may be referred to as a main board, or a printed board assembly (PBA).

The communication circuitry 130 may be electrically connected with each of the first antenna 116-1 to the fourth antenna 116-4. For example, the communication circuitry 130 may be electrically connected with each of the first antenna 116-1 to the fourth antenna 116-4 through specified wires, or conductors. In the disclosure, the communication circuitry 130 may be referred to as a wireless communication circuitry.

The processor 140 may be electrically connected with the communication circuitry 130. The processor 140 may sweep a phase of at least one of the first antenna 116-1 to the fourth antenna 116-4 through the communication circuitry 130. For example, the processor 140 may determine, as a first best antenna, any one of the first antenna 116-1 to the fourth antenna 116-4 based on the first signal (or received signal) received from a base station 10. The first best antenna may refer to an antenna, which has the greatest reference signal received power (RSRP) value, among the first antenna 116-1 to the fourth antenna 116-4. When the first best antenna is determined, the processor 140 may determine, to a first best antenna direction, a phase sweep direction of remaining antennas other than the first best antenna.

The processor 140 may transmit a second signal (or transmit signal) to the base station 10 through the communication circuitry 130 and the plurality of antennas 116-1, 116-2, 116-3, and 116-4. In this case, the processor 140 may receive a third signal (or a reflected transmit signal) fed back through the communication circuitry 130. In the disclosure, the third signal may refer to a signal reflected from a specific device (e.g., a coupler) to be introduced into the processor 140 again while the second signal passes through the communication circuitry 130. The processor 140 may determine, as a second best antenna, any one of the first antenna 116-1 to the fourth antenna 116-4 based on the third signal. The second best antenna may refer to an antenna, which has the greatest gain, among the first antenna 116-1 to the fourth antenna 116-4.

According to an embodiment, the processor 140 may seep at least one of the plurality of antennas 116-1, 116-2, 116-3, and 116-4 based on whether the first best antenna is matched to the second best antenna. For example, when the first best antenna is not matched to the second best antenna, the electronic device 100 may enter a first sweep mode (or a wide sweep mode). To the contrary, when the first best antenna is matched to the second best antenna, the electronic device 100 may enter the second sweep mode (or a narrow sweep mode). In this disclosure, the first sweep mode may refer to a mode or state in which the processor 140 may sweep the phases of the antennas 116-1, 116-2, 116-3, and 116-4 within a wide range. The second sweep mode may refer to a mode or state in which the processor 140 may sweep the phases of the antennas 116-1, 116-2, 116-3, and 116-4 within a narrow range.

According to a comparative example, an electronic device may require a larger number of slots to determine the optimal phase corresponding to the base station direction. As the time to determine the phase of the antennas is delayed, the transmission efficiency of the antennas may be reduced and power consumption of the electronic device may be increased. However, according to an embodiment of the disclosure, when the first best antenna is determined, the phase sweep direction of the remaining antennas may be determined to the first best antenna direction, thereby reducing the time to determine the optimal phase. In the disclosure, the time to determine the phase may refer to time required to determine the phase for a next transmit signal. In addition, according to an embodiment of the disclosure, the phase is swept based on the first sweep mode or the second sweep mode, thereby matching a receive beam direction to a transmit beam direction.

The battery 150 may bi-directionally convert chemical energy into electrical energy. For example, the battery 150 may convert the chemical energy into the electrical energy, and supply the converted electrical energy to various components or modules mounted on the display 160 and the printed circuitry board 120. Alternatively, the battery 150 may convert electrical energy, which is received from the outside, into chemical energy to be stored. According to an embodiment, the printed circuitry board 120 may include a power management module to manage charging and discharging of the battery 150.

The display 160 may be disposed under the cover glass 112. The display 160 is electrically connected with the printed circuitry board 120 to output content (e.g., a text, an image, a video, an icon, a widget, or a symbol), or to receive a touch input (e.g., touch, gesture, or hovering) from a user.

The shielding layer 170 may be disposed between the display 160 and the side-surface member 116. The shielding layer 170 may shield an electromagnetic wave generated between the display 160 and the printed circuitry board 120 to prevent electromagnetic interference between the display 160 and the printed circuitry board 120.

According to an embodiment, the shielding layer 170 may include a thin film sheet or plate formed of copper (Cu) or graphite. When the shielding layer 170 is formed of copper or graphite, components included in the electronic device 100 may be grounded on the shielding layer 170.

The electronic device 100 illustrated in FIG. 1 is provided only for the illustrative purpose, and the embodiments described in the disclosure are not limited to the configuration illustrated in FIG. 1. For example, the electronic device 100 illustrated in FIG. 1 may further include components not illustrated in FIG. 1, and some components illustrated in FIG. 1 may be omitted. In the disclosure, components having reference numerals the same as the reference numerals in the electronic device 100 illustrated in FIG. 1 may have the same content as that described with reference to FIG. 1.

Figure 2:
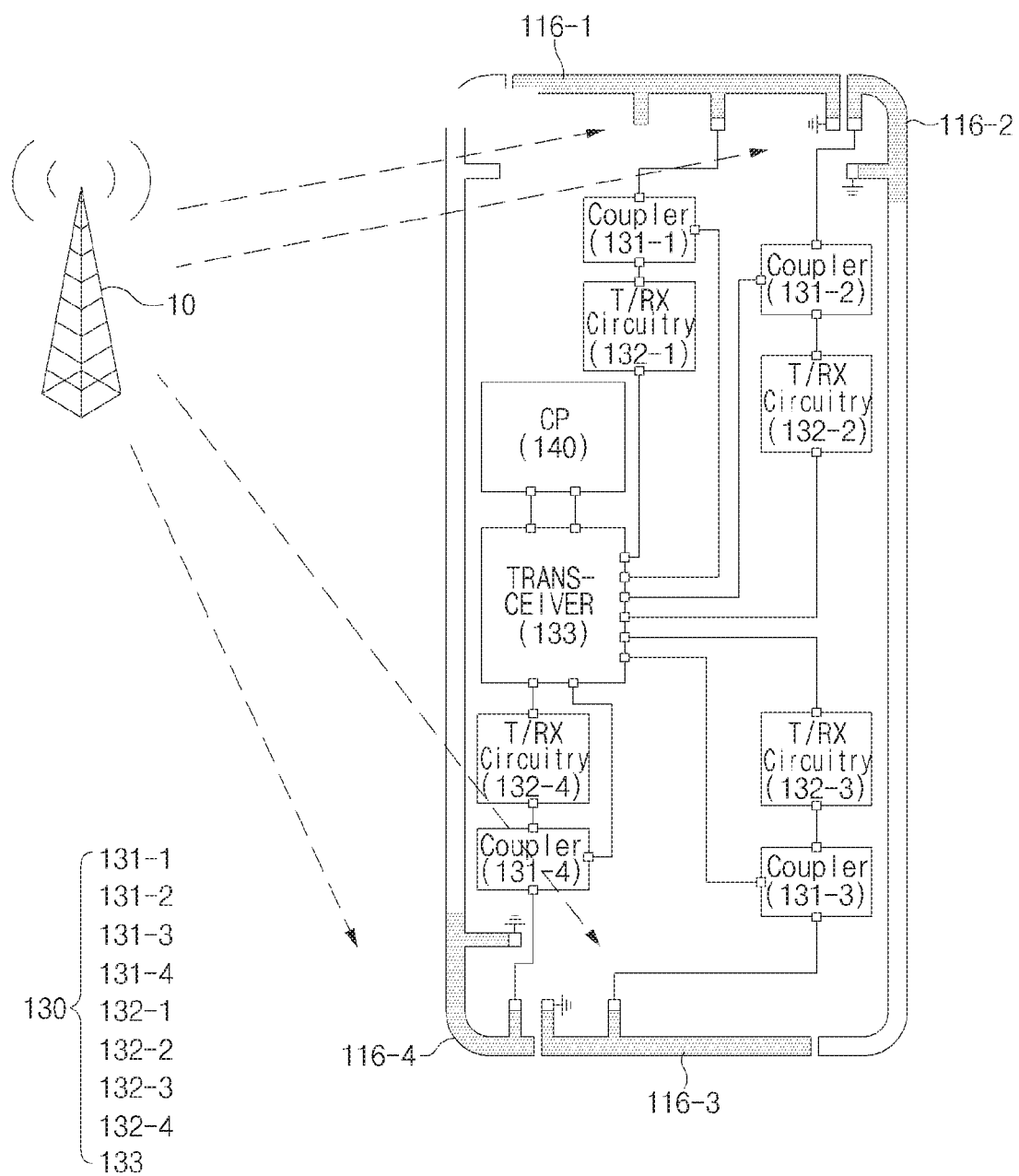
FIG. 2 illustrates a housing, a communication circuitry, and a processor, according to an embodiment.

FIG. 2 illustrates a housing, a communication circuitry, and a processor, according to an embodiment. FIG. 2 illustrates that components included in the communication circuitry 130 illustrated in FIG. 1 are coupled to the antennas 116-1, 116-2, 116-3, and 116-4.

Referring to FIG. 2, the communication circuitry 130 may include a plurality of couplers 131-1, 131-2, 131-3, and 131-4, a plurality of transmit/receive circuits 132-1, 132-2, 132-3, and 132-4, and/or transceiver 133.

Each of the couplers 131-1, 131-2, 131-3, and 131-4 may monitor the second signal when the second signal (or the transmit signal) is transmitted to the base station 10 through the antennas 116-1, 116-2, 116-3, and 116-4. For example, each of the couplers 131-1, 131-2, 131-3, and 131-4 may monitor whether the second signal to be transmitted by the processor 140 is transmitted and/or whether a second signal having a proper amount of power is transmitted.

In another embodiment, each of the couplers 131-1, 131-2, 131-3, and 131-4 may transmit, to the transceiver 133, the third signal (or the feedback signal) obtained as the second signal is reflected in the process of passing through each of the couplers 131-1, 131-2, 131-3, and 131-4. For example, when the processor 140 transmits the second signal to the base station 10 through the transceiver 133, the first transmit/receive circuitry 132-1, the first coupler 131-1, and the first antenna 116-1, the first coupler 131-1 may transmit the third signal to the transceiver 133.

Each of the transmit/receive circuits 132-1, 132-2, 132-3, and 132-4 amplifies the second signal to be transmitted to the couplers 131-1 and 131-2, 131-3, and 131-4 when transmitting the second signal to the base station 10. To the contrary, each of the transmit/receive circuits 132-1, 132-2, 132-3, and 132-4 may transmit the first signal (or the receive signal) received from the base station 10 to the transceiver 133.

The transceiver 133 (or the processor 140) may measure a first parameter based on the first signal received from the transmit/receive circuits 132-1, 132-2, 132-3, and 132-4. For example, when the first signal is received from the base station 10 through the first antenna 116-1 to the fourth antenna 116-4, the transceiver 133 may measure a reference signal received power (RSRP) value of each of the first antenna 116-1 to the fourth antenna 116-4.

In another embodiment, the transceiver 133 may detect the third signal received from the couplers 131-1, 131-2, 131-3, and 131-4. For example, the transceiver 133 may detect a third signal obtained as the second signal is reflected in the process of passing through the couplers 131-1, 131-2, 131-3, and 131-4. When the third signal is detected, the transceiver 133 may demodulate the third signal to be transmitted to the processor 140.

As another embodiment, the transceiver 133 may change the amplitude, frequency, and phase information of the second signal.

The processor 140 may determine the first best antenna based on the first parameter measured by the transceiver 133. For example, the first antenna 116-1 of the first antenna 116-1 to the fourth antenna 116-4 is at the shortest distance to the base station 10, so the first antenna 116-1 may represent the biggest RSRP value. Accordingly, the processor 140 may determine the first antenna 116-1 as the first best antenna. In the disclosure, the first best antenna may be referred to as the best RSRP antenna.

The processor 140 may measure the second parameter based on the third signal received from the transceiver 133. For example, the processor 140 may measure an I/Q value of each of the first antenna 116-1 to the fourth antenna 116-4 based on the third signal demodulated by the transceiver 133. In the disclosure, the I/Q values may refer to data used by the processor 140 to determine the states (e.g., the gains of the antennas) of the first antenna 116-1 to the fourth antenna 116-4.

The processor 140 may determine the second best antenna based on the second parameter measured by the transceiver 133. For example, the processor 140 may compare the second parameter with a mapping table stored in the memory, and determine an antenna having the greatest gain as the second best antenna based on the comparison result. In the disclosure, the second best antenna may be referred to as a best gain antenna.

When the first best antenna and the second best antenna are determined, the processor 140 may sweep the phase of any one of the plurality of antennas 116-1, 116-2, 116-3, and 116-4 based on whether the first best antenna is matched to the second best antenna. For example, when the first best antenna is not matched to the second best antenna, the electronic device 100 may enter a first sweep mode (or a wide sweep mode). In the first sweep mode, the processor 140 may sweep the phases of the antennas 116-1, 116-2, 116-3, and 116-4 in the wide range. To the contrary, when the first best antenna is matched to the second best antenna, the electronic device 100 may enter the second sweep mode (or a narrow sweep mode). In the second sweep mode, the processor 140 may sweep the phases of the antennas 116-1, 116-2, 116-3, and 116-4 in the narrow range In the disclosure, components having reference numerals the same as the reference numerals in the communication circuitry 130 illustrated in FIG. 2 may have the same content as that described with reference to FIG. 2.

Figure 3:
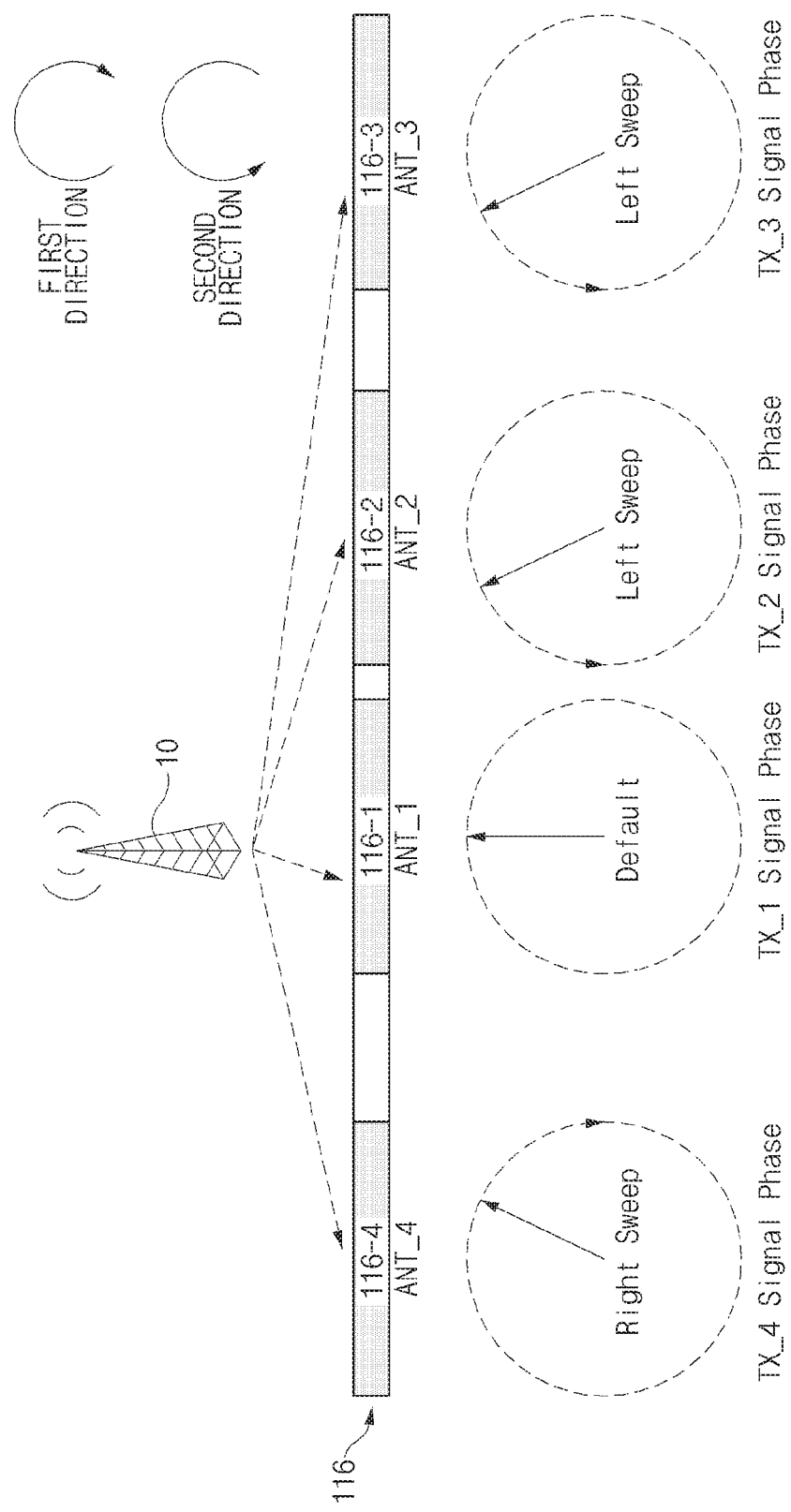
FIG. 3 illustrates a block diagram of antennas to receive a first signal (or a receive signal) from a base station, according to an embodiment.

FIG. 3 illustrates a block diagram of antennas to receive a first signal (or a receive signal) from a base station, according to an embodiment. FIG. 3 is a view illustrating a procedure to determine the first best antenna in detail.

Referring to FIG. 3, the first antenna 116-1 to the fourth antenna 116-4 may receive the first signal (or the receive signal) from the base station 10. The transceiver 133 (or the processor 140) may measure the first parameter (e.g., a reference signal received power (RSRP)) of each of the first antenna 116-1 to the fourth antenna 116-4 based on the received first signal.

In FIG. 3, the first antenna 116-1, the second antenna 116-2, the fourth antenna 116-4, and the third antenna 116-3 are positioned closely to the base station 10 in order of the first antenna 116-1, the second antenna 116-2, the fourth antenna 116-4, and the third antenna 116-3, and thus have RSRP values increased in order of the first antenna 116-1, the second antenna 116-2, the fourth antenna 116-4, and the third antenna 116-3. Because the RSRP value of the first antenna 116-1 is greatest, the electronic device 100 may determine the first antenna 116-1 as the first best antenna.

When the first best antenna is determined, the processor 140 may determine, to a first best antenna direction, phase sweep directions of remaining antennas other than the first best antenna. For example, because the first antenna 116-1 is the first best antenna, the processor 140 may determine the phase sweep directions of the second antenna 116-2 to the fourth antenna 116-4 to the direction of the first antenna 116-1. In more detail, the processor 140 may determine the phase sweep direction such that the phase of the second antenna 116-2 is swept in the second direction, the phase of the third antenna 116-3 is swept in the second direction, and the phase of the fourth antenna 116-4 is swept in the first direction. The first direction may be referred to as a clockwise or a right rotational direction, and the second direction may be referred to as a counterclockwise or a left rotational direction.

However, according to an embodiment of the disclosure, when the first best antenna is determined, the phase sweep directions of the remaining antennas may be determined to the first best antenna direction, thereby reducing the time to determine the optimal phase. As the time to determine the phase is reduced, the transmission efficiency of the antennas 116-1, 116-2, 116-3, and 116-4 may be increased, and power consumption of the electronic device 100 may be reduced.

Meanwhile, the embodiment illustrated in FIG. 3 is provided only for the illustrative purpose, and embodiments of the disclosure are not limited to the configuration illustrated in FIG. 3. For example, one of the second antenna 116-2, the third antenna 116-3, and the fourth antenna 116-4 may be determined as the first best antenna depending on the position or the gripping state of an electric device.

Figure 4A:
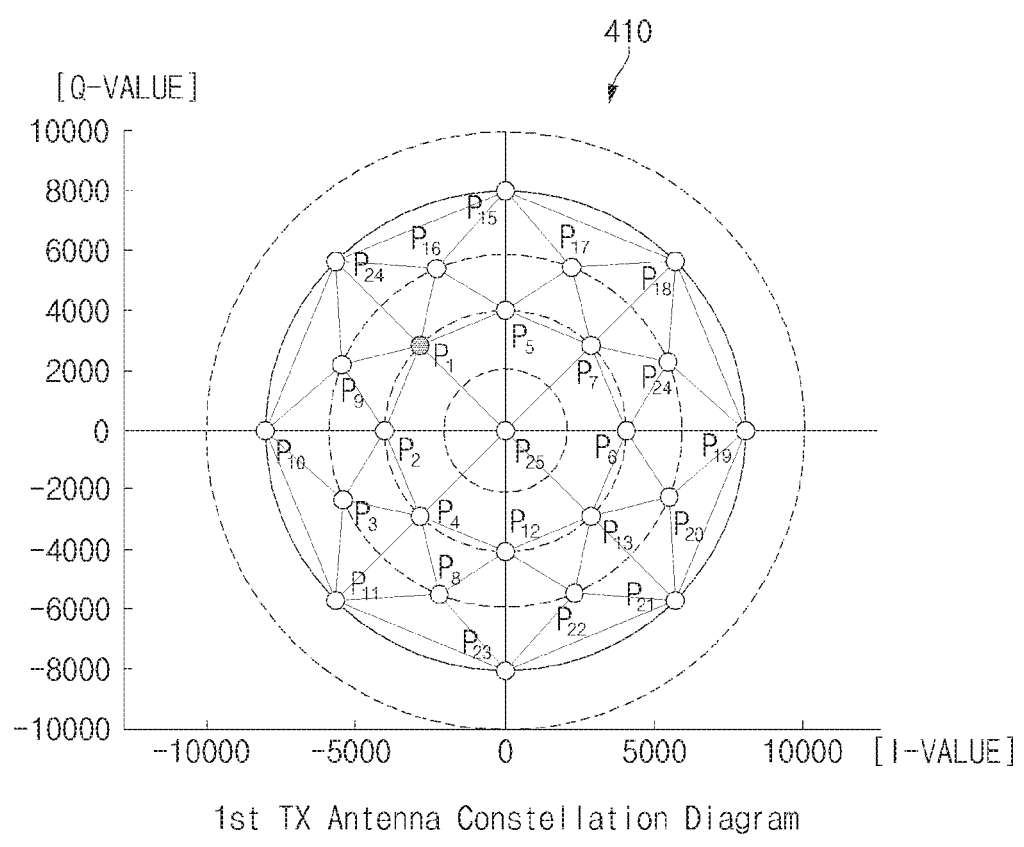
FIG. 4A illustrates a constellation diagram of a first antenna according to an embodiment.
Figure 4B:
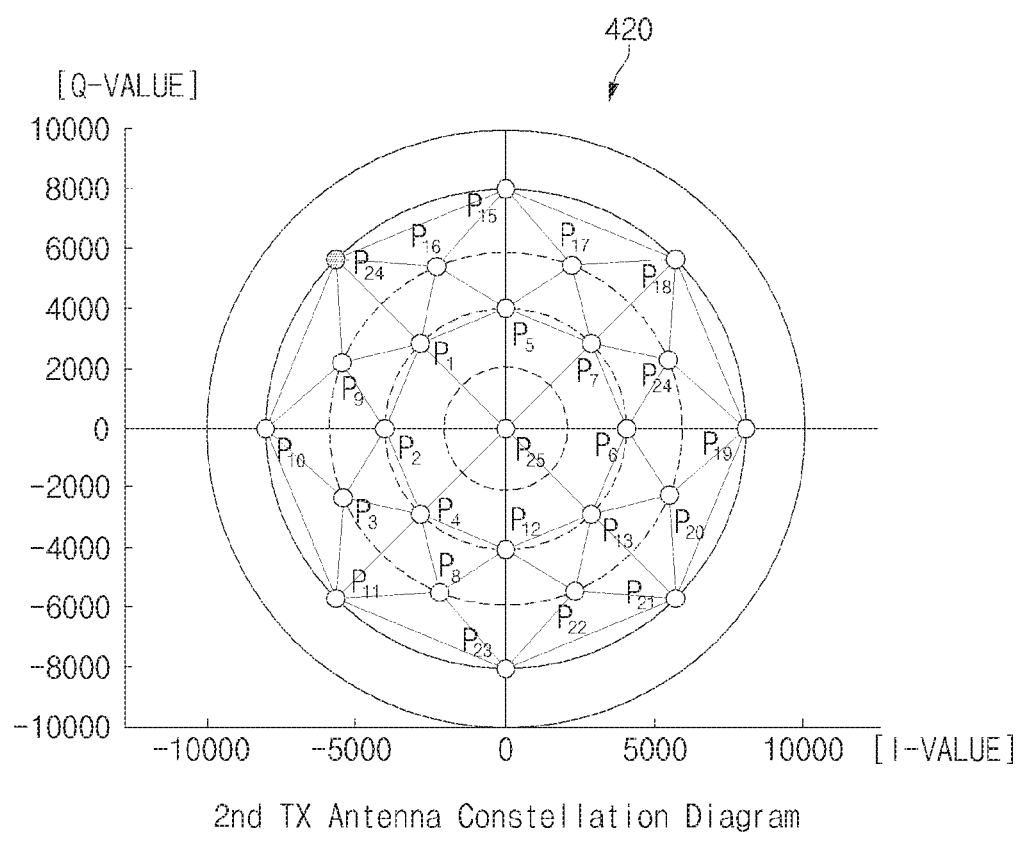
FIG. 4B illustrates a constellation diagram of a second antenna, according to an embodiment.

FIG. 4A illustrates a constellation diagram of a first antenna, according to an embodiment. FIG. 4B illustrates a constellation diagram of a second antenna, according to an embodiment. FIGS. 4A and 4B are views illustrating the procedure of determining the second best antenna in detail.

Referring to FIGS. 4A and 4B, the processor 140 may measure the I/Q value for the third signal (or the feedback signal) reflected in a coupler. The measured I/Q value may be divided into a real value (I-Value) and an imaginary value (Q-Value). The real value and imaginary value may be combined and defined as a complex value, and may be expressed in the form of the constellations 410 and 420 of FIGS. 4A and 4B.

The processor 140 may determine the second best antenna by comparing the measured I/Q value with the mapping table stored in the memory. The mapping table is a table including a magnitude value, a phase value, an antenna gain, and/or a user scenario corresponding to the I/Q value, and may be defined as in following Table 1.

TABLE 1

| Index | I-Value | Q-Value | Magnitude | Phase (angle) | Antenna gain | User scenario (user state) |
|---|---|---|---|---|---|---|
| P1 | −4337 | 3835 | 0.40 | 0.0 | −6 dBi | Ear jack |
| P2 | −5203 | 533 | 0.40 | 45.0 | −4 dBi | Free space |
| (omitted) | (omitted) | (omitted) | (omitted) | (omitted) | (omitted) | (omitted) |
| P24 | −2115 | 9317 | 0.80 | 315.0 | −12 dBi | Hand |
| P25 | −1599 | 931 | 0.00 | 0.0 | −8 dBi | USB cable |

According to one embodiment, the processor 140 may determine the second best antenna by comparing the constellations 410 and 420 illustrated in FIGS. 4A and 4B with Table 1. In the case of the first antenna 116-1, because the I/Q value in the constellation is P1, the processor 140 may determine the gain of the first antenna 116-1 as −6 dBi. In the case of the second antenna 116-2, because the I/Q value in the constellation is P24, the processor 140 may determine the gain of the second antenna 116-2 as −12 dBi. Because the gain of the first antenna 116-1 has a value greater than that of the second antenna 116-2, the processor 140 may determine the first antenna 116-1 as the second best antenna. The above-described determination process may be applied to the third antenna 116-3 and the fourth antenna 116-4. For example, the processor 140 compares the gains of the first antenna 116-1 to the fourth antenna 116-4 with each other, thereby determining any one of the first antenna 116-1 to the fourth antenna 116-4 as the second best antenna. For example, when the gain of the first antenna 116-1 is −6 dBi, the gain of the second antenna 116-2 is −12 dBi, the gain of the third antenna 116-3 is −4 dBi, and the gain the fourth antenna 116-4 is −8 dBi, the processor 140 may determine the third antenna 116-3 as the second best antenna.

Figure 5A:
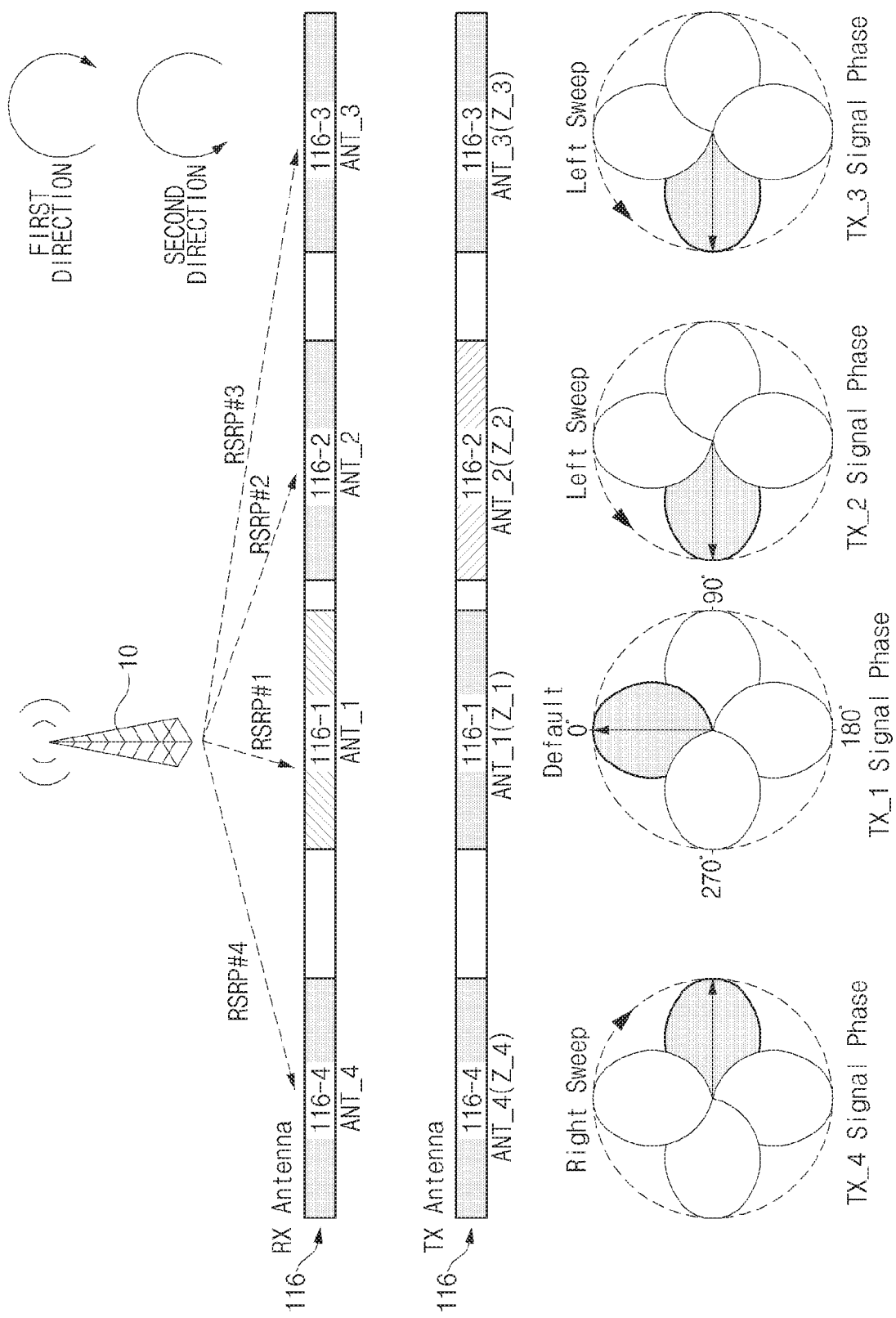
FIG. 5A illustrates an electronic device for sweeping a phase in a first sweep mode (or wide sweep mode), according to an embodiment.
Figure 5B:
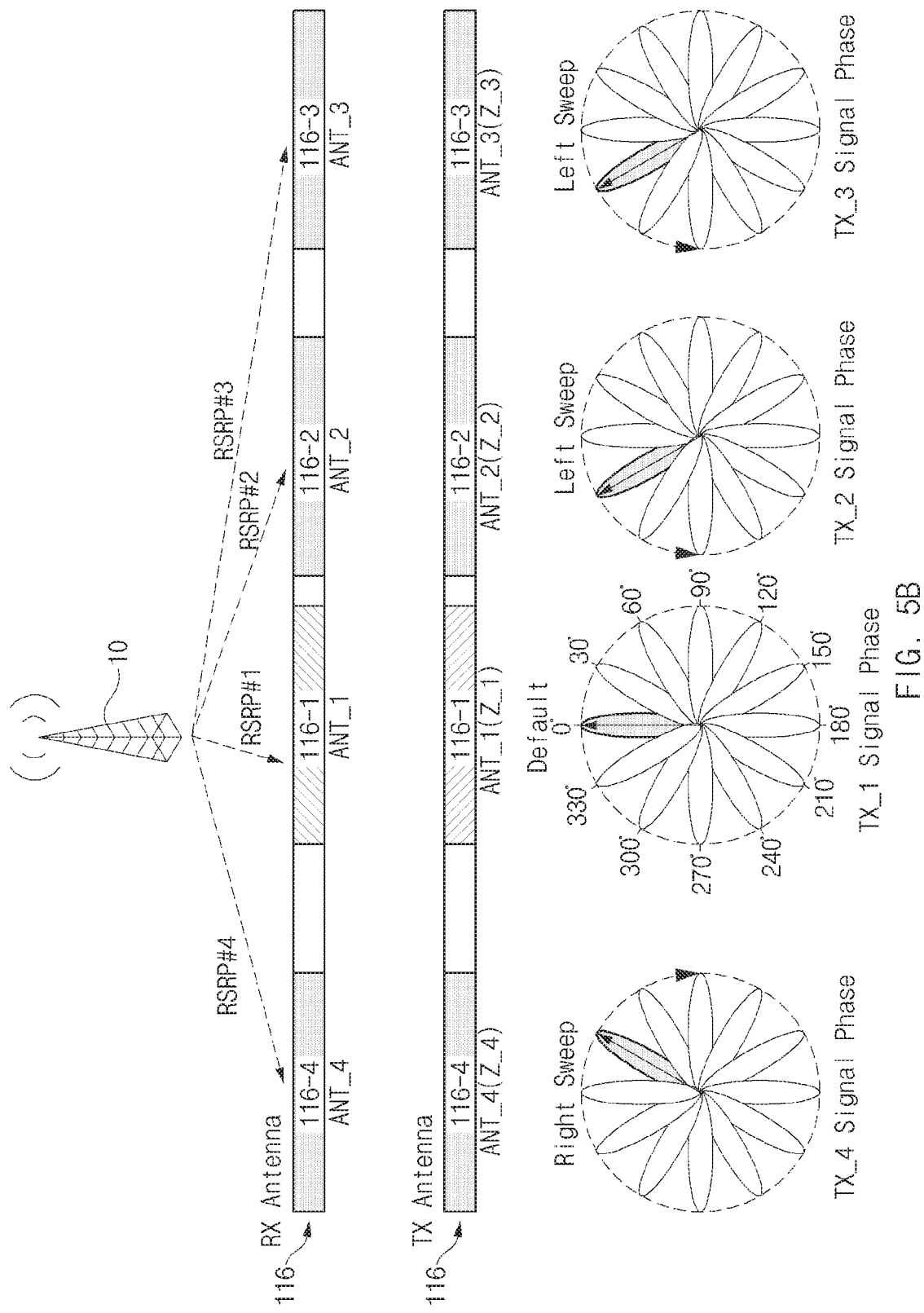
FIG. 5B illustrates an electronic device for sweeping a phase in a second sweep mode (or narrow sweep mode), according to an embodiment.

FIG. 5A illustrates an electronic device for sweeping a phase in a first sweep mode (or wide sweep mode), according to an embodiment. FIG. 5B illustrates an electronic device for sweeping a phase in a second sweep mode (or narrow sweep mode), according to an embodiment. FIG. 5A illustrates that the electronic device 100 illustrated in FIG. 1 sweeps the phases of the antennas 116-1, 116-2, 116-3, and 116-4 in the first sweep mode. FIG. 5B illustrates that the electronic device 100 illustrated in FIG. 1 sweeps the phases of the antennas 116-1, 116-2, 116-3, and 116-4 in the second sweep mode.

Referring to FIG. 5A, the first best antenna may be the first antenna 116-1, and the second best antenna may be the second antenna 116-2. Because the first best antenna is not matched to the second best antenna, the electronic device 100 may enter the first sweep mode. The first sweep mode may have a plurality of sweeping ranges with a great offset difference. For example, the first sweep mode may have four sweeping ranges, in which the phases of the antennas 116-1, 116-2, 116-3, and 116-4 may be swept by 90°.

According to an embodiment, in the first sweep mode, the processor 140 may sweep the phases of the antennas 116-1, 116-2, 116-3, and 116-4 by 90° in the first direction or the second direction. For example, because the phase needs to be swept in the direction of the first best antenna, the processor 140 may sweep the phases of the second antenna 116-2 and the third antenna 116-3 by 90° in the second direction. In the case of the fourth antenna 116-4, the processor 140 may sweep the phase of the fourth antenna 116-4 by 90° in the first direction.

Referring to FIG. 5B, the first best antenna and the second best antenna may be the first antenna 116-1. Because the first best antenna is matched to the second best antenna, the electronic device 100 may enter the second sweep mode. The second sweep mode may have a plurality of sweeping ranges with a smaller offset difference. For example, the second sweep mode may have 12 sweeping ranges, in which the phases of the antennas 116-1, 116-2, 116-3, and 116-4 may be swept by 30°.

According to an embodiment, in the second sweep mode, the processor 140 may sweep the phases of the antennas 116-1, 116-2, 116-3, and 116-4 by 30° in the first direction or the second direction. For example, because the phase needs to be swept in the direction of the first best antenna, the processor 140 may sweep the phases of the second antenna 116-2 and the third antenna 116-3 by 30° in the second direction. In the case of the fourth antenna 116-4, the processor 140 may sweep the phase of the fourth antenna 116-4 by 30° in the first direction.

According to an embodiment of the disclosure, the first best antenna is compared with the second best antenna, and the entrance into the first sweep mode or the second sweep mode is performed based on the comparison result, thereby matching a receive beam direction to a transmit beam direction. Meanwhile, the first sweep mode and the second sweep mode illustrated in FIGS. 5A and 5B are provided only for the illustrative purpose, and embodiments of the disclosure are not limited to the configurations of FIGS. 5A and 5B. For example, the first sweep mode may have two sweeping ranges, and the second sweep mode may have 16 sweeping ranges.

Figure 6:
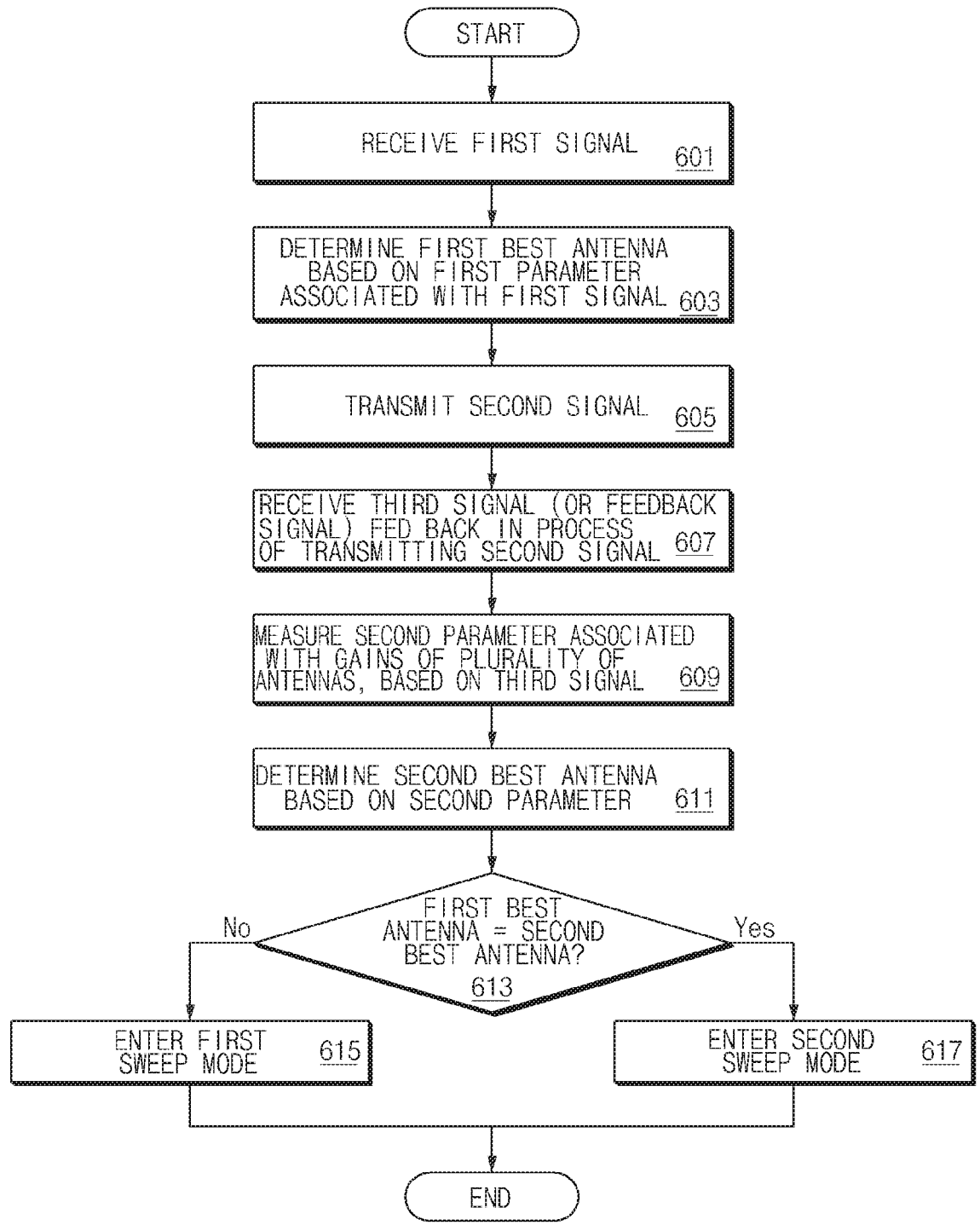
FIG. 6 is a flowchart illustrating an operation of an electronic device, according to an embodiment.

FIG. 6 is a flowchart illustrating an operation of an electronic device, according to an embodiment. FIG. 6 illustrates a flowchart of an operation of the electronic device 100 illustrated in FIG. 1.

Referring to FIG. 6, in operation 601, the processor 140 receives a first signal through the plurality of antennas 116-1, 116-2, 116-3, and 116-4, and the communication circuitry 130. For example, the first signal may be transmitted to the processor 140 through the plurality of antennas 116-1, 116-2, 116-3, and 116-4, the couplers 131-1, 131-2, 131-3, and 131-4, the transmit/receive circuitries 132-1, 132-2, 132-3, and 132-4, and the transceiver 133.

In operation 603, the processor 140 may measure a first parameter based on the first signal and determine a first best antenna based on the first parameter. For example, when the first signal is received from the base station 10 through the first antenna 116-1 to the fourth antenna 116-4, the transceiver 133 may measure the reference signal received power (RSRP) value of each of the first antenna 116-1 to the fourth antenna 116-4. The processor 140 may determine an antenna having the greatest RSRP value as the first best antenna.

Although not illustrated in FIG. 6, after the first best antenna is determined, the processor 140 determines whether a parameter (e.g., target transmit power parameter) received from the base station 10 is greater than or equal to a threshold value (e.g., 18 dBm). When the parameter is greater than or equal to the threshold value, based on the determination result, the processor 140 may activate a phase sweep mode (e.g., the first sweep mode and/or the second sweep mode).

In operation 605, the processor 140 may transmit the second signal (or transmit signal) to the base station 10. For example, the processor 140 may transmit the second signal through the transceiver 133, the transmit/receive circuitries 132-1, 132-2, 132-3, and 132-4, the couplers 131-1, 131-2, 131-3, and 131-4, and the antennas 116-1, 116-2, 116-3, and 116-4.

In operation 607, the processor 140 may receive the third signal (or feedback signal) fed back in the process of transmitting the second signal. For example, each of the couplers may transmit, to the processor 140, the third signal (or feedback signal) obtained as the second signal is reflected in the process of passing through the couplers.

In operation 609, the processor 140 may measure a second parameter associated with gains of the plurality of antennas 116-1, 116-2, 116-3, and 116-4, based on the third signal. For example, the processor 140 may measure the I/Q value of each of the first antenna 116-1 to the fourth antenna 116-4 based on the third signal.

In operation 611, the processor 140 may determine the second best antenna based on the second parameter. For example, the processor 140 may compare the second parameter with a mapping table (e.g., table 1) stored in the memory, and determine, as the second best antenna, an antenna having the greatest gain based on the comparison result.

In operation 613, the processor 140 may compare the first best antenna with the second best antenna, and enter the first sweep mode or the second sweep mode based on the comparison result. For example, when the first best antenna is not matched to the second best antenna, the processor 140 may enter the first sweep mode (or the wide sweep mode). To the contrary, when the first best antenna is matched to the second best antenna, the processor 140 may enter the second sweep mode (or the narrow sweep mode).

In operation 615, the processor 140 may sweep the phases of the antennas 116-1, 116-2, 116-3, and 116-4 within a sweeping range with a great offset difference. To the contrary, in operation 617, the processor 140 may sweep the phases of the antennas 116-1, 116-2, 116-3, and 116-4 within a sweeping range with a small offset difference.

Figure 7:
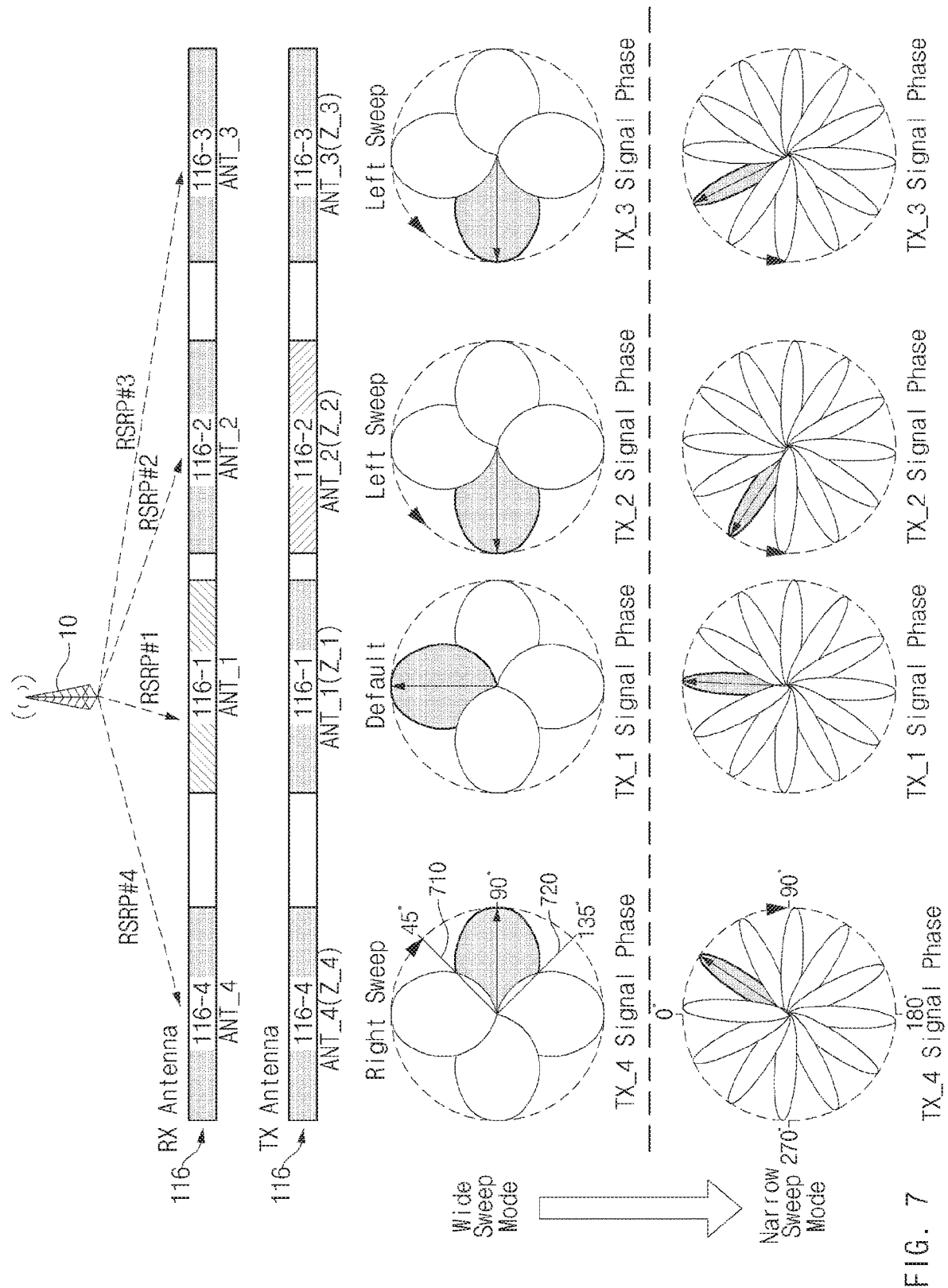
FIG. 7 illustrates an electronic device to enter a second sweep mode from a first sweep mode, according to an embodiment.

FIG. 7 illustrates an electronic device to enter a second sweep mode from a first sweep mode, according to an embodiment. FIG. 7 illustrates that the electronic device 100 of FIG. 1 changes the sweep mode.

Referring to FIG. 7, when the first best antenna is the first antenna 116-1 and the second best antenna is the second antenna 116-2, the electronic device 100 may enter the first sweep mode. Thereafter, when the first best antenna and the second best antenna are matched to each other as the first antenna 116-1, the electronic device 100 may enter the second sweep mode. The electronic device 100 may determine the phase in the second sweep mode, based on the offset in the first sweep mode, when entering the second sweep mode from the first sweep mode.

In the description using the fourth antenna 116-4, a first offset 710 may be 45° and a second offset 720 may be 135° in the first sweep mode. When the electronic device 100 enters the second sweep mode from the first sweep mode, the phase of the fourth antenna 116-4 may be changed, and the phase may be determined based on the first offset 710 and/or the second offset 720. For example, the electronic device 100 may set an angle (e.g., 50°) between 30° and 60° based on 45° as the phase of the fourth antenna 116-4. The description of the fourth antenna 116-4 may be applied to the second antenna 116-2 and the third antenna 116-3.

Meanwhile, the electronic device 100 may not change the phase of the first best antenna, which is different from other antennas. For example, the electronic device 100 may not change the phase of the first antenna 116-1 even when entering the second sweep mode from the first sweep mode.

Figure 8:
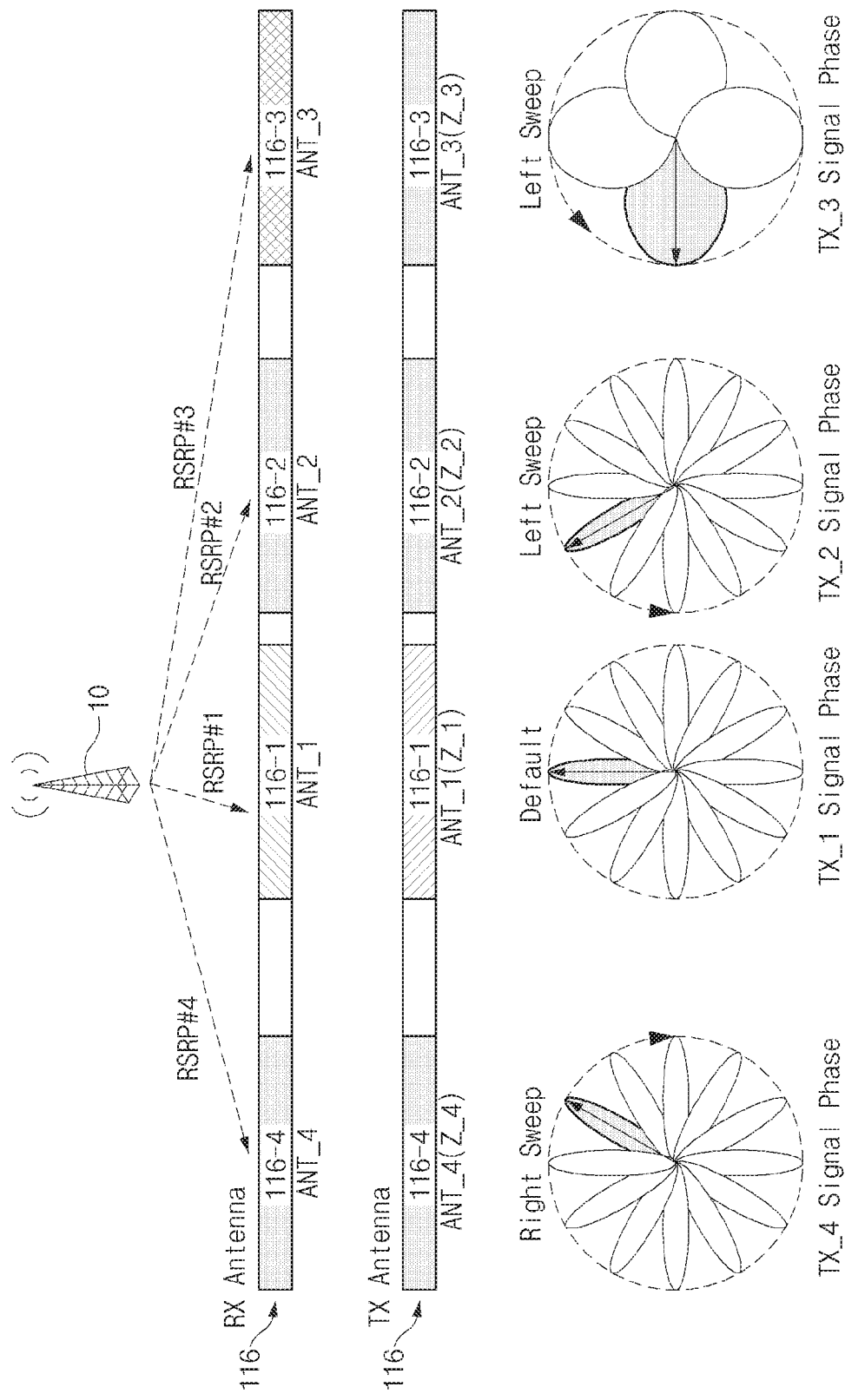
FIG. 8 illustrates an electronic device in which some of antennas sweep a phase based on a first sweep mode and remaining antennas sweep a phase based on the second sweep mode, according to an embodiment.

FIG. 8 illustrates an electronic device in which some of antennas sweep a phase based on a first sweep mode and remaining antennas sweep a phase based on the second sweep mode, according to an embodiment. FIG. 8 illustrates that the electronic device 100 of FIG. 1 sweeps the phases of some antennas and remaining antennas based on mutually different sweep modes.

Referring to FIG. 8, even if the first best antenna and the second best antenna are matched to each other as the first antenna 116-1, the electronic device 100 may sweep the phases of some antennas based on the first sweep mode. For example, the electronic device 100 may sweep the phase of the third antenna 116-3 based on the first sweep mode, and the phases of the remaining antennas 116-1, 116-2, and 116-4 may be swept based on the second sweep mode.

More specifically, the electronic device 100 may measure first parameter values (e.g., reference signal received power (RSRP) values) of the first antenna 116-1 to the fourth antenna 116-4. The electronic device 100 may determine the first best antenna based on the first parameter value. In this case, the electronic device 100 may determine, as an exceptional antenna, an antenna having a difference of a specified level or more from the RSRP value of the first best antenna. In FIG. 8, the first best antenna may be the first antenna 116-1. In this case, when the RSRP value of the third antenna 116-3 differs from the RSRP value of the first best antenna by the specified level or more, the electronic device 100 may determine the third antenna 116-3 as the exceptional antenna.

When the exceptional antenna is determined, even if the first best antenna is matched to the second best antenna, the electronic device 100 may sweep a phase of the exceptional antenna based on the first weep mode. In the embodiment of FIG. 8, because the third antenna 116-3 is the exceptional antenna, the electronic device 100 may sweep the phases of the first antenna 116-1, the second antenna 116-2, and the fourth antenna 116-4 based on the second sweep mode, and may sweep the phase of the third antenna 116-3 based on the first sweep mode.

According to an embodiment, when the abnormal state is released, the electronic device 100 may sweep the phase of the exceptional antenna based on the second sweep mode. In the above embodiment, when the abnormal state of the third antenna 116-3 is released, the electronic device 100 may sweep the phase of the third antenna 116-3 based on the second sweep mode.

Meanwhile, the embodiment illustrated in FIG. 8 is provided only for the illustrative purpose, and the embodiments of the disclosure are not limited thereto. For example, the electronic device 100 may determine the exceptional antenna based on data other than the RSRP.

Figure 9:
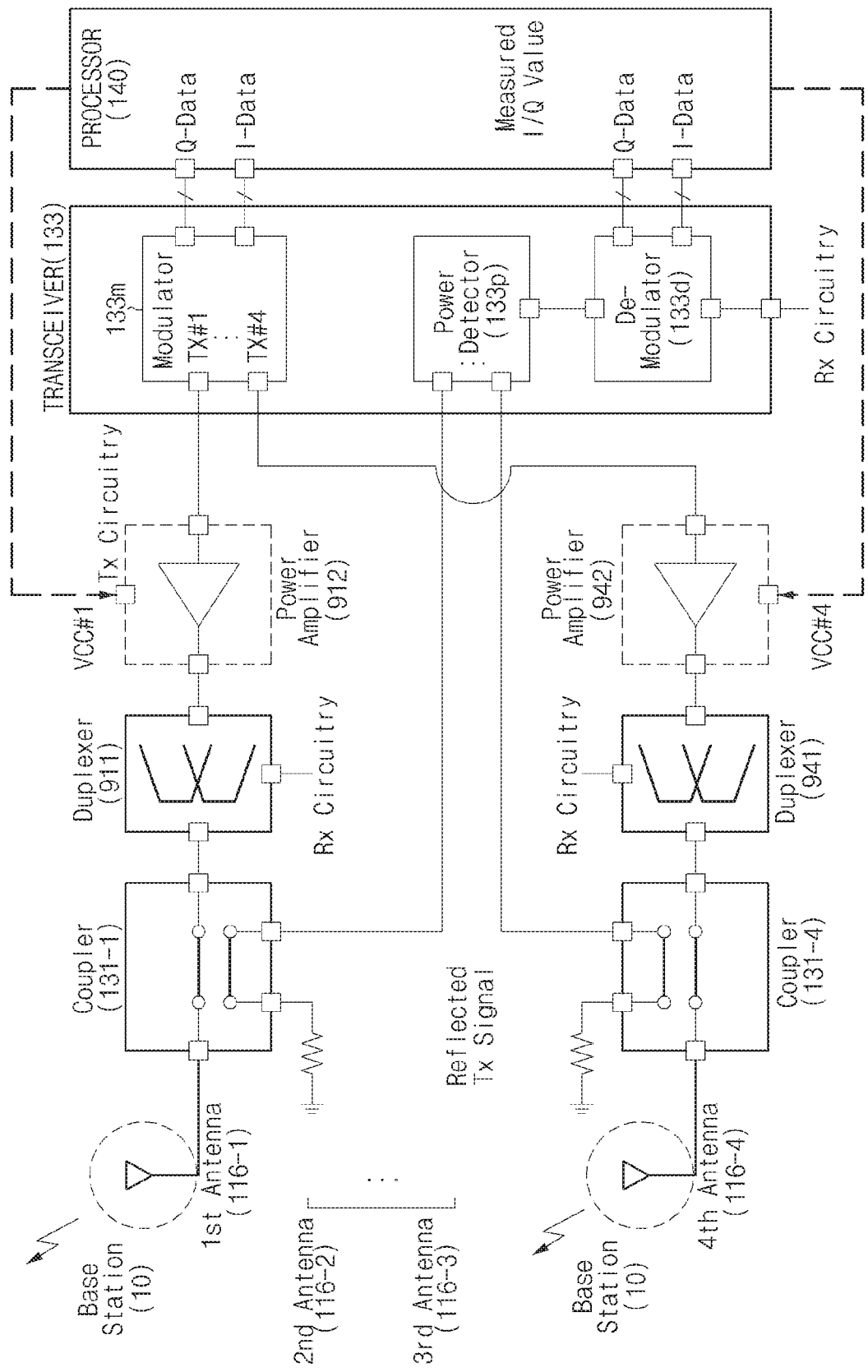
FIG. 9 is a detailed block diagram of a communication circuitry and a processor, according to an embodiment.

FIG. 9 is a detailed block diagram of a communication circuitry and a processor according to an embodiment. FIG. 9 is a detailed block diagram of the communication circuitry 130 and the processor 140 illustrated in FIGS. 1 and 2.

Referring to FIG. 9, each of transmit circuitries 132-1, 132-2, 132-3, and 132-4 may include a duplexer (e.g., 911) and a power amplifier (e.g., 912). The transceiver 133 may include a modulator 133$m$, a power detector 133$p$, and/or a de-modulator 133$d$. The process of transmitting and receiving a signal through the first antenna 116-1 may be substantially identically applied to the second antenna 116-2 to the fourth antenna 116-4. Accordingly, the following description will be made while focusing on the first antenna 116-1.

The modulator 133$m$ may transmit the second signal (or transmit signal) to the base station 10 through the first antenna 116-1. For example, the second signal may be transmitted to the base station 10 through the processor 140, the modulator 133$m$, the first power amplifier 912, the first duplexer 911, the first coupler 131-1, and the first antenna 116-1. In this case, the first power amplifier 912 may amplify the second signal, and the first duplexer 911 may separate transmit and receive frequencies.

The power detector 133$p$ may detect the third signal (or feedback signal) obtained as the second signal is reflected in the process in which the second signal is transmitted. The power detector 133$p$ may transmit the detected third signal to the de-modulator 133$d$.

According to an embodiment, the de-modulator 133$d$ may demodulate a signal received by the electronic device 100 through an antenna. For example, the de-modulator 133$d$ may demodulate the third signal received from the power detector 133$p$. The de-modulator 133$d$ may transmit the demodulated third signal to the processor 140.

The processor 140 may measure the second parameter (e.g., the I/Q value) based on the demodulated third signal. For example, the processor 140 may measure an I/Q value of each of the first antenna 116-1 to the fourth antenna 116-4 based on the third signal demodulated by the de-modulator 133$d$. In the disclosure, the I/Q value may refer to data used by the processor 140 to determine the state (e.g., the gain of the antenna) of the first antenna 116-1 to the fourth antenna 116-4.

Figure 10A:
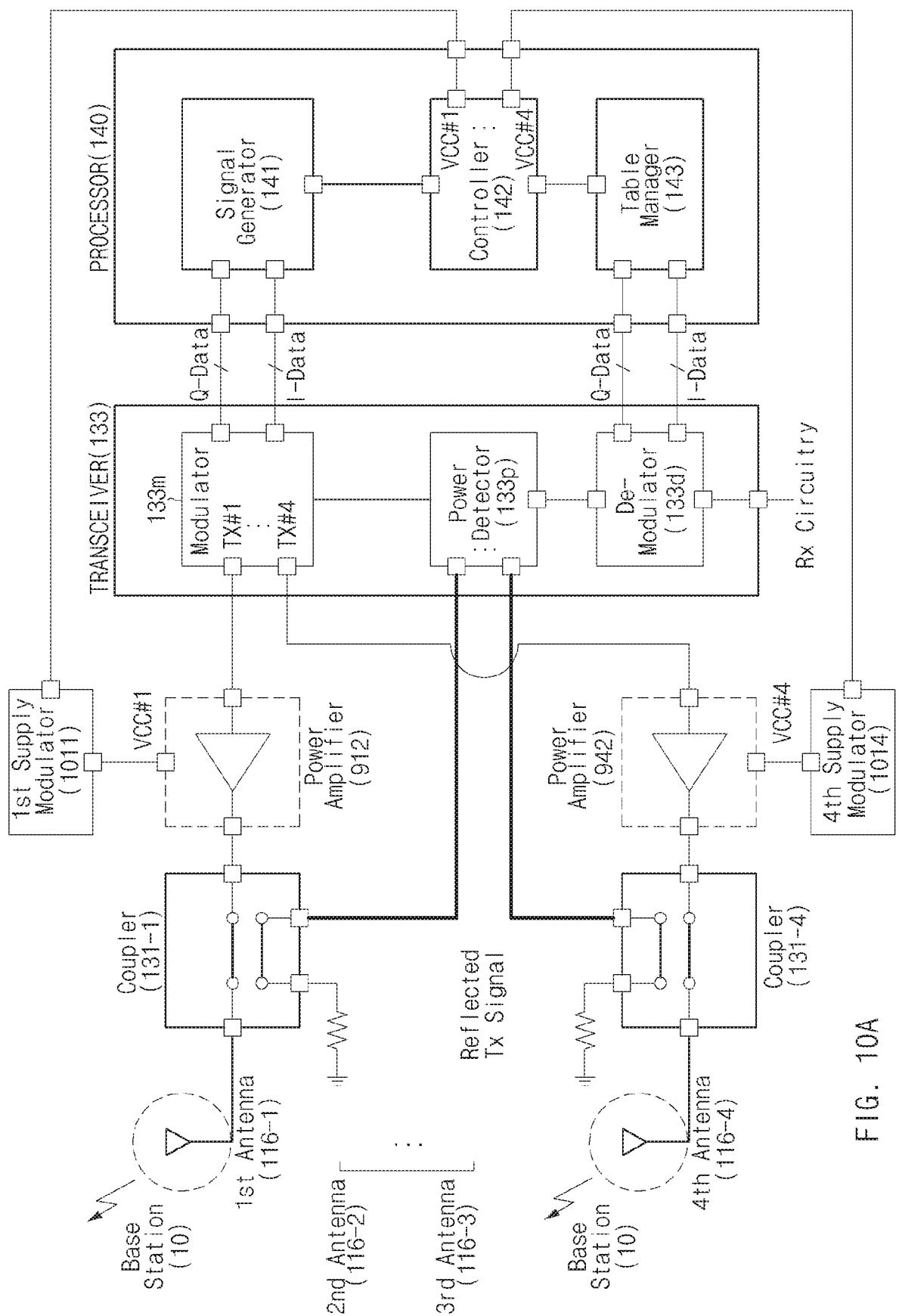
FIG. 10A illustrates a detailed block diagram of a communication circuitry and a processor, according to another embodiment.

FIG. 10A illustrates a detailed block diagram of a communication circuitry and a processor, according to another embodiment. FIG. 10A is a detailed block diagram of the communication circuitry 130 and the processor 140 illustrated in FIGS. 1 and 2.

Figure 10B:
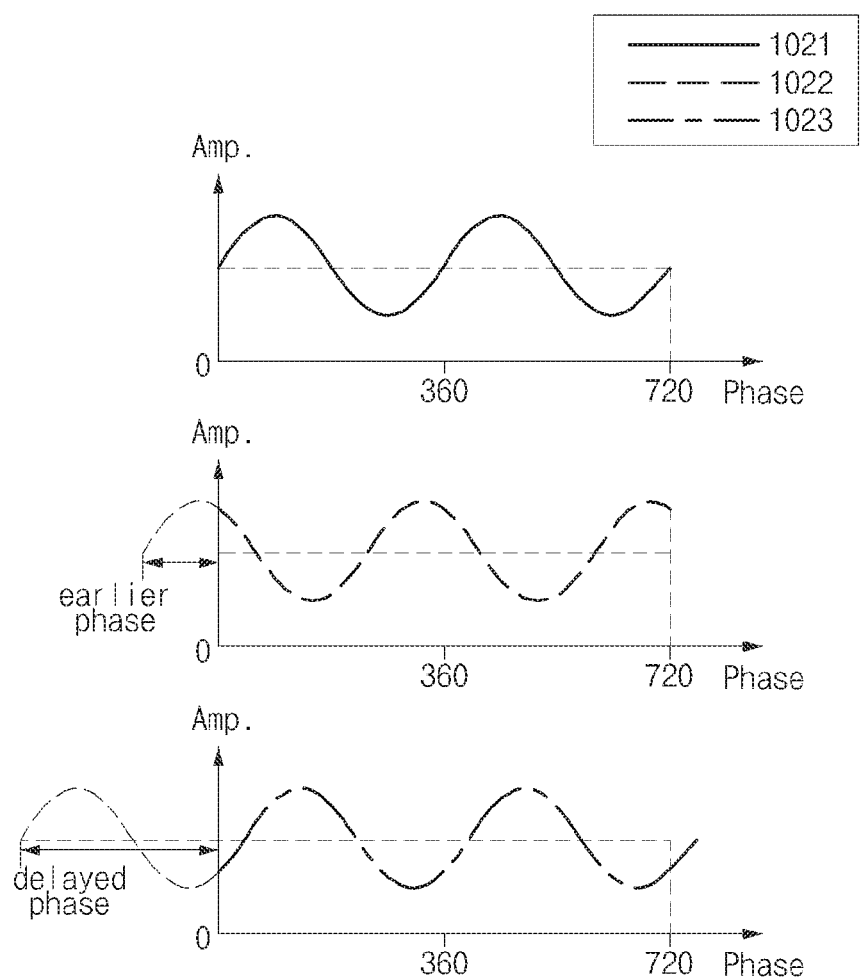
FIG. 10B illustrates transmit signals according to various embodiments.

FIG. 10B illustrates transmit signals, according to various embodiments. The graphs shown in FIG. 10B show a transmit signal of the first best antenna and phase-swept transmit signals.

Referring to FIG. 10A, the communication circuitry 130 may further include power modulators 1011 and 1014 (supply modulators). The processor 140 may include a signal generator 141, a controller 142, and/or a table manager 143. The process of transmitting and receiving a signal through the first antenna 116-1 may be substantially identically applied to the second antenna 116-2 to the fourth antenna 116-4. Accordingly, the following description will be made while focusing on the first antenna 116-1.

The signal generator 141 may generate a transmit signal. The generated signal may be radiated through the modulator 133m, the first power amplifier 912, the first coupler 131-1, and the first antenna 116-1.

The controller 142 may control the first power modulator 1011 such that a voltage is supplied to the first power amplifier 912 in the process of radiating the transit signal. For example, the controller 142 may transmit an ADC value to the first power modulator 1011, and the first power modulator 1011 may convert the ADC value into a voltage to be supplied to the first power amplifier 912. The first power amplifier 912 may amplify the transmit signal generated by the signal generator 141.

The table manager 143 may store a mapping table. The table manager 143 may compare the I/Q value measured by the controller 142 with the mapping table, and determine the second best antenna based on the comparison result. When the second best antenna is determined, the controller 142 may sweep the phase of each of the antennas 116-1, 116-2, 116-3, and 116-4 based on the first sweep mode or the second sweep mode.

Referring to FIG. 10B, a graph 1021 represents the transmit signal of the first best antenna, a graph 1022 represents a transmit signal having a phase swept in the second direction, and a graph 1023 represents a transmit signal having a phase swept in a third direction. When sweeping the phase in the second direction, the controller 142 may generate a transmit signal having a phase earlier than a phase of the first best antenna. To the contrary, when sweeping the phase in the third direction, the controller 142 may generate a transmit signal having a phase more delayed than a phase of the first best antenna. According to an embodiment of the disclosure, as illustrated in FIG. 10B, a receive beam direction may be matched to a transmit beam direction by sweeping the phase of a transmit signal.

According to an embodiment of the disclosure, an electronic device 100 may include a housing 110, a plurality of antennas 116-1, 116-2, 116-3, and 116-4 positioned at mutually different areas of the housing 110, respectively, a wireless communication circuitry 130 to transmit a diversity signal using the plurality of antennas 116-1, 116-2, 116-3, and 116-4, a processor 140 operatively connected with the wireless communication circuitry 130, and a memory operatively connected with the processor 140 to store instructions. The instructions may cause the processor 140 to, when executed, receive at least one signal from a base station using the antennas 116-1, 116-2, 116-3, and 116-4, measure the at least one signal which is received, select a first antenna of the antennas, based at least partially on the measured result, transmit at least one signal to transmit the diversity signal using the antennas 116-1, 116-2, 116-3, and 116-4, determine at least one gain of at least one transmitted signal, select a second antenna of the antennas 116-1, 116-2, 116-3, and 116-4 based at least partially on the determined gain, compare the first antenna with the second antenna, and sweep a phase of at least one of the antennas 116-1, 116-2, 116-3, and 116-4 based on at least partially on the comparison result.

According to an embodiment of the disclosure, the measuring may include measuring of reference signal received power (RSRP).

According to an embodiment of the disclosure, the instructions may cause the processor 140 to determine the gain by determining an impedance associated with the at least one transmitted signal.

According to an embodiment of the disclosure, the wireless communication circuitry 130 may include a feedback circuit (e.g., 131-1 of FIG. 2) connected with a transmit path of the wireless communication circuitry 130, and the instructions may cause the processor 140 to determine the impedance using the feedback circuit.

According to an embodiment of the disclosure, the instructions may cause the processor 140 to switch between a first sweep mode having a first number of sweeping ranges and a second sweep mode having a second number of sweeping ranges, based at least partially on the comparison result, and the first number is different from the second number.

According to an embodiment of the disclosure, the instructions may cause the processor 140 to sweep, based on a phase determined in the first sweep mode, the phase in the second sweep mode, when switching from the first sweep mode to the second sweep mode.

According to an embodiment of the disclosure, the first number may be smaller than the second number.

According to an embodiment of the disclosure, the first number may correspond to '4', and the second number may correspond to one between 8 and 16.

According to an embodiment of the disclosure, the second number may correspond to 12.

According to an embodiment of the disclosure, the instructions may cause the processor 140 to more rapidly perform the first sweep mode than the second sweep mode.

According to an embodiment of the disclosure, the instructions may cause the processor 140 to perform the second sweep mode when the first antenna is matched to the second antenna, and the instructions may cause the processor 140 to perform the first sweep mode, when the first antenna is different from the second antenna.

According to an embodiment of the disclosure, the instructions may cause the processor 140 to sweep the phase in a range of 360°.

According to an embodiment of the disclosure, an electronic device 100 may include a housing 110 including a cover glass 112, a back cover 114 opposite to the cover glass 112, and a side-surface member 116 surrounding a space between the cover glass 112 and the back cover 114, a plurality of antennas 116-1, 116-2, 116-3, and 116-4 including mutually different areas of the side-surface member 116, a communication circuitry 130 electrically connected with each of the plurality of antennas 116-1, 116-2, 116-3, and 116-4, and a processor 140 electrically connected with the communication circuitry 130. The processor 140 may be configured to receive a first signal from a base station 10 through the communication circuitry 130 and the plurality of antennas 116-1, 116-2, 116-3, and 116-4, determine, as a first best antenna, one of the plurality of antennas 116-1, 116-2, 116-3, and 116-4, based on a first parameter associated with power of the first signal, transmit a second signal to the base station 10 through the communication circuitry 130 and the plurality of antennas 116-1, 116-2, 116-3, and 116-4, receive a third signal fed back through the communication circuitry 130 in a process in which the second signal is transmitted, measure a second parameter associated with a gain of the plurality of antennas 116-1, 116-2, 116-3, and 116-4, based on the third signal, determine, as a second best antenna, one of the plurality of antennas 116-1, 116-2, 116-3, and 116-4, based on the second parameter, and sweep a phase of at least one of the plurality of antennas 116-1, 116-2, 116-3, and 116-4 based on whether the first best antenna is matched to the second best antenna.

According to an embodiment of the disclosure, the processor 140 may be configured to sweep the phase of the at least one based on a first sweep mode having a first sweeping range, when the first best antenna is not matched to the second best antenna, and sweep the phase of the at least one based on a second sweep mode having a second sweeping range smaller than the first sweeping rang, when the first best antenna is matched to the second best antenna.

According to an embodiment of the disclosure, the processor 140 is configured to sweep the phase of the at least one based on the second sweep mode, when the first best antenna is matched to the second best antenna, in the first sweep mode.

According to an embodiment of the disclosure, the processor 140 may configured to measure a reference signal received power (RSRP) value of each of the plurality of antennas 116-1, 116-2, 116-3, and 116-4, and determine one of the plurality of antennas 116-1, 116-2, 116-3, and 116-4 as a first best antenna based on the measurement result According to an embodiment of the disclosure, the electronic device may further include a memory configured to store a mapping table including a gain of the plurality of antennas 116-1, 116-2, 116-3, and 116-4. The processor 140 may be configured to compare the mapping table with the second parameter, and determine one of the plurality of antennas 116-1, 116-2, 116-3, and 116-4 as a second best antenna, based on the comparison result.

According to an embodiment of the disclosure, the communication circuitry 130 may include a coupler to transmit the third signal to the processor 140. The coupler may include a transmit line to transmit the second signal to the plurality of antennas 116-1, 116-2, 116-3, and 116-4 and a feedback line coupled to the transmit line.

According to an embodiment of the disclosure, a method for sweeping phases of a plurality of antennas 116-1, 116-2, 116-3, and 116-4 may include receiving a first signal from a base station 10 through a communication circuitry 130 and the plurality of antennas 116-1, 116-2, 116-3, and 116-4, determining, as a first best antenna, one of the plurality of antennas 116-1, 116-2, 116-3, and 116-4, based on a first parameter associated with power of the first signal, transmitting a second signal to the base station 10 through the communication circuitry 130 and the plurality of antennas 116-1, 116-2, 116-3, and 116-4, receiving a third signal fed back through the communication circuitry 130 in a process in which the second signal is transmitted, measuring a second parameter associated with a gain of the plurality of antennas 116-1, 116-2, 116-3, and 116-4, based on the third signal, determining, as a second best antenna, one of the plurality of antennas 116-1, 116-2, 116-3, and 116-4, based on the second parameter, and sweeping a phase of at least one of the plurality of antennas 116-1, 116-2, 116-3, and 116-4 based on whether the first best antenna is matched to the second best antenna.

According to an embodiment of the disclosure, the sweeping of the phase of the at least one may include sweeping the phase of the at least one based on a first sweep mode having a first sweeping range, when the first best antenna is not matched to the second best antenna, and sweeping the phase of the at least one based on a second sweep mode having a second sweeping range smaller than the first sweeping rang, when the first best antenna is matched to the second best antenna.

Figure 11:
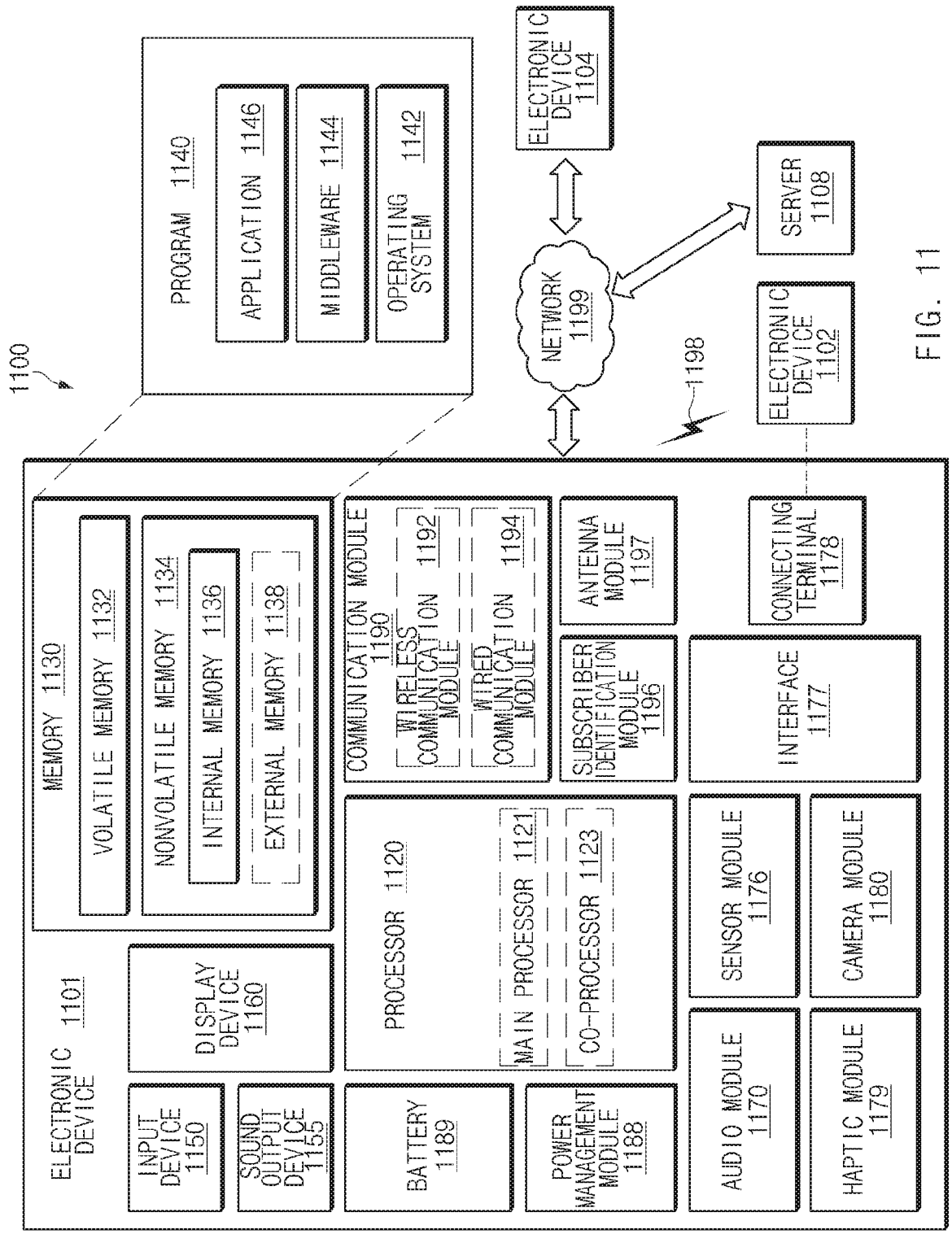
FIG. 11 is a block diagram of an electronic device 1101 in a network environment 1100 according to various embodiments.

FIG. 11 is a block diagram of an electronic device 1101 in a network environment 1100 according to various embodiments.

Referring to FIG. 11, an electronic device 1101 may communicate with an electronic device 1102 through a first network 1198 (e.g., a short-range wireless communication) or may communicate with an electronic device 1104 or a server 1108 through a second network 1199 (e.g., a long-distance wireless communication) in a network environment 1100. According to an embodiment, the electronic device 1101 may communicate with the electronic device 1104 through the server 1108. According to an embodiment, the electronic device 1101 may include a processor 1120, a memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module 1196, and an antenna module 1197. According to some embodiments, at least one (e.g., the display device 1160 or the camera module 1180) among components of the electronic device 1101 may be omitted or other components may be added to the electronic device 1101. According to some embodiments, some components may be integrated and implemented as in the case of the sensor module 1176 (e.g., a fingerprint sensor, an iris sensor, or an illuminance sensor) embedded in the display device 1160 (e.g., a display).

The processor 1120 may operate, for example, software (e.g., a program 1140) to control at least one of other components (e.g., a hardware or software component) of the electronic device 1101 connected to the processor 1120 and may process and compute a variety of data. The processor 1120 may load a command set or data, which is received from other components (e.g., the sensor module 1176 or the communication module 1190), into a volatile memory 1132, may process the loaded command or data, and may store result data into a nonvolatile memory 1134. According to an embodiment, the processor 1120 may include a main processor 1121 (e.g., a central processing unit or an application processor) and an auxiliary processor 1123 (e.g., a graphic processing device, an image signal processor, a sensor hub processor, or a communication processor), which operates independently from the main processor 1121, additionally or alternatively uses less power than the main processor 1121, or is specified to a designated function. In this case, the auxiliary processor 1123 may operate separately from the main processor 1121 or embedded.

In this case, the auxiliary processor 1123 may control, for example, at least some of functions or states associated with at least one component (e.g., the display device 1160, the sensor module 1176, or the communication module 1190) among the components of the electronic device 1101 instead of the main processor 1121 while the main processor 1121 is in an inactive (e.g., sleep) state or together with the main processor 1121 while the main processor 1121 is in an active (e.g., an application execution) state. According to an embodiment, the auxiliary processor 1123 (e.g., the image signal processor or the communication processor) may be implemented as a part of another component (e.g., the camera module 1180 or the communication module 1190) that is functionally related to the auxiliary processor 1123.

The memory 1130 may store a variety of data used by at least one component (e.g., the processor 1120 or the sensor module 1176) of the electronic device 1101, for example, software (e.g., the program 1140) and input data or output data with respect to commands associated with the software. The memory 1130 may include the volatile memory 1132 or the nonvolatile memory 1134.

The program 1140 may be stored in the memory 1130 as software and may include, for example, an operating system 1142, a middleware 1144, or an application 1146.

The input device 1150 may be a device for receiving a command or data, which is used for a component (e.g., the processor 1120) of the electronic device 1101, from an outside (e.g., a user) of the electronic device 1101 and may include, for example, a microphone, a mouse, or a keyboard.

The sound output device 1155 may be a device for outputting a sound signal to the outside of the electronic device 1101 and may include, for example, a speaker used for general purposes, such as multimedia play or recordings play, and a receiver used only for receiving calls. According to an embodiment, the receiver and the speaker may be either integrally or separately implemented.

The display device 1160 may be a device for visually presenting information to the user of the electronic device 1101 and may include, for example, a display, a hologram device, or a projector and a control circuitry for controlling a corresponding device. According to an embodiment, the display device 1160 may include a touch circuitry or a pressure sensor for measuring an intensity of pressure on the touch.

The audio module 1170 may convert a sound and an electrical signal in dual directions. According to an embodiment, the audio module 1170 may obtain the sound through the input device 1150 or may output the sound through an external electronic device (e.g., the electronic device 1102 (e.g., a speaker or a headphone)) wired or wirelessly connected to the sound output device 1155 or the electronic device 1101.

The sensor module 1176 may generate an electrical signal or a data value corresponding to an operating state (e.g., power or temperature) inside or an environmental state outside the electronic device 1101. The sensor module 1176 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1177 may support a designated protocol wired or wirelessly connected to the external electronic device (e.g., the electronic device 1102). According to an embodiment, the interface 1177 may include, for example, an HDMI (high-definition multimedia interface), a USB (universal serial bus) interface, an SD card interface, or an audio interface.

A connecting terminal 1178 may include a connector that physically connects the electronic device 1101 to the external electronic device (e.g., the electronic device 1102), for example, an HDMI connector, a USB connector, an SD card connector, or an audio connector (e.g., a headphone connector).

The haptic module 1179 may convert an electrical signal to a mechanical stimulation (e.g., vibration or movement) or an electrical stimulation perceived by the user through tactile or kinesthetic sensations. The haptic module 1179 may include, for example, a motor, a piezoelectric element, or an electric stimulator.

The camera module 1180 may shoot a still image or a video image. According to an embodiment, the camera module 1180 may include, for example, at least one lens, an image sensor, an image signal processor, or a flash.

The power management module 1188 may be a module for managing power supplied to the electronic device 1101 and may serve as at least a part of a power management integrated circuitry (PMIC).

The battery 1189 may be a device for supplying power to at least one component of the electronic device 1101 and may include, for example, a non-rechargeable (primary) battery, a rechargeable (secondary) battery, or a fuel cell.

The communication module 1190 may establish a wired or wireless communication channel between the electronic device 1101 and the external electronic device (e.g., the electronic device 1102, the electronic device 1104, or the server 1108) and support communication execution through the established communication channel. The communication module 1190 may include at least one communication processor operating independently from the processor 1120 (e.g., the application processor) and supporting the wired communication or the wireless communication. According to an embodiment, the communication module 1190 may include a wireless communication module 1192 (e.g., a cellular communication module, a short-range wireless communication module, or a GNSS (global navigation satellite system) communication module) or a wired communication module 1194 (e.g., an LAN (local area network) communication module or a power line communication module) and may communicate with the external electronic device using a corresponding communication module among them through the first network 1198 (e.g., the short-range communication network such as a Bluetooth, a WiFi direct, or an IrDA (infrared data association)) or the second network 1199 (e.g., the long-distance wireless communication network such as a cellular network, an internet, or a computer network (e.g., LAN or WAN)). The above-mentioned various communication modules 1190 may be implemented into one chip or into separate chips, respectively. According to an embodiment, the wireless communication module 1192 may identify and authenticate the electronic device 1101 using user information stored in the subscriber identification module 1196 in the communication network.

The antenna module 1197 may include one or more antennas to transmit or receive the signal or power to or from an external source. According to an embodiment, the communication module 1190 (e.g., the wireless communication module 1192) may transmit or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1101 and the external electronic device 1104 through the server 1108 connected to the second network 1199. Each of the electronic devices 1102 and 1104 may be the same or different types as or from the electronic device 1101. According to an embodiment, all or some of the operations performed by the electronic device 1101 may be performed by another electronic device or a plurality of external electronic devices. When the electronic device 1101 performs some functions or services automatically or by request, the electronic device 1101 may request the external electronic device to perform at least some of the functions related to the functions or services, in addition to or instead of performing the functions or services by itself. The external electronic device receiving the request may carry out the requested function or the additional function and transmit the result to the electronic device 1101. The electronic device 1101 may provide the requested functions or services based on the received result as is or after additionally processing the received result. To this end, for example, a cloud computing, distributed computing, or client-server computing technology may be used.

The electronic device according to various embodiments disclosed in the disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the disclosure should not be limited to the above-mentioned devices.

It should be understood that various embodiments of the disclosure and terms used in the embodiments do not intend to limit technologies disclosed in the disclosure to the particular forms disclosed herein; rather, the disclosure should be construed to cover various modifications, equivalents, and/or alternatives of embodiments of the disclosure. With regard to description of drawings, similar components may be assigned with similar reference numerals. As used herein, singular forms may include plural forms as well unless the context clearly indicates otherwise. In the disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuitry (ASIC).

Various embodiments of the disclosure may be implemented by software (e.g., the program 1140) including an instruction stored in a machine-readable storage media (e.g., an internal memory 1136 or an external memory 1138) readable by a machine (e.g., a computer). The machine may be a device that calls the instruction from the machine-readable storage media and operates depending on the called instruction and may include the electronic device (e.g., the electronic device 1101). When the instruction is executed by the processor (e.g., the processor 1120), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the disclosure may be executed sequentially, in parallel, repeatedly, or in a heuristic method. Also, at least some operations may be executed in different sequences, omitted, or other operations may be added.

What is claimed is:

1. An electronic device comprising:
a housing;
a plurality of antennas positioned at mutually different areas of the housing, respectively;
wireless communication circuitry configured to transmit a diversity signal using the plurality of antennas;
a processor operatively connected with the wireless communication circuitry; and
a memory operatively connected with the processor and configured to store instructions,
wherein the instructions, when executed, cause the processor to control the electronic device to:
receive at least one signal from a base station using the antennas,
measure the at least one signal which is received,
select a first antenna of the antennas, based at least partially on the measured result,
transmit at least one signal to transmit the diversity signal using the antennas,
determine at least one gain of the at least one transmitted signal,
select a second antenna of the antennas based at least partially on the determined gain,
compare the first antenna with the second antenna, and
sweep a phase of at least one of the antennas based on at least partially on the comparison result.

2. The electronic device of claim 1, wherein the measuring includes measuring of reference signal received power (RSRP).

3. The electronic device of claim 2, wherein the instructions cause the processor to control the electronic device to:

determine the gain by determining an impedance associated with the at least one transmitted signal.

4. The electronic device of claim 3, wherein the wireless communication circuitry includes a feedback circuit connected with a transmit path of the wireless communication circuitry, and wherein the instructions cause the processor to control the electronic device to determine the impedance using the feedback circuit.

5. The electronic device of claim 1, wherein the instructions cause the processor to control the electronic device to:

switch between a first sweep mode having a first number of sweeping ranges and a second sweep mode having a second number of sweeping ranges, based at least partially on the comparison result, and wherein the first number is different from the second number.

6. The electronic device of claim 5, wherein the instructions cause the processor to control the electronic device to:

sweep, based on a phase determined in the first sweep mode, a phase in the second sweep mode, when switching from the first sweep mode to the second sweep mode.

7. The electronic device of claim 5, wherein the first number is smaller than the second number.

8. The electronic device of claim 7, wherein the first number corresponds to '4', and the second number corresponds to any one between 8 and 16.

9. The electronic device of claim 8, wherein the second number corresponds to 12.

10. The electronic device of claim 5, wherein the instructions cause the processor to control the electronic device to:

more rapidly perform the first sweep mode than the second sweep mode.

11. The electronic device of claim 10, wherein the instructions cause the processor to control the electronic device to:

perform the second sweep mode when the first antenna is matched to the second antenna, and perform the first sweep mode, when the first antenna is different from the second antenna.

12. The electronic device of claim 1, wherein the instructions cause the processor to control the electronic device to:

sweep the phase in a range of 360°.

13. An electronic device comprising:

a housing including a cover glass, a back cover opposite to the cover glass, and a side-surface member surrounding a space between the cover glass and the back cover;

a plurality of antennas including mutually different areas of the side-surface member;

communication circuitry electrically connected with each of the plurality of antennas; and a processor electrically connected with the communication circuitry, wherein the processor is configured to control the electronic device to:

receive a first signal from a base station through the communication circuitry and the plurality of antennas;

determine, as a first best antenna, any one of the plurality of antennas, based on a first parameter associated with power of the first signal;

transmit a second signal to the base station through the communication circuitry and the plurality of antennas;

receive a third signal fed back through the communication circuitry in a process in which the second signal is transmitted;

measure a second parameter associated with a gain of the plurality of antennas, based on the third signal;

determine, as a second best antenna, any one of the plurality of antennas, based on the second parameter; and sweep a phase of at least one of the plurality of antennas based on whether the first best antenna is matched to the second best antenna.

14. The electronic device of claim 13, wherein the processor is configured to control the electronic device to:

sweep the phase of the at least one of the plurality of antennas based on a first sweep mode having a first sweeping range, when the first best antenna is not matched to the second best antenna, and sweep the phase of the at least one of the plurality of antennas based on a second sweep mode having a second sweeping range smaller than the first sweeping range, when the first best antenna is matched to the second best antenna.

15. The electronic device of claim 14, wherein the processor is configured to control the electronic device to:

sweep the phase of the at least one of the plurality of antennas based on the second sweep mode, when the first best antenna is matched to the second best antenna in the first sweep mode.

* * * * *